(12) United States Patent
Mukawa

(10) Patent No.: US 6,331,916 B1
(45) Date of Patent: Dec. 18, 2001

(54) VIRTUAL IMAGE OPTICAL SYSTEM

(75) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/615,478

(22) Filed: Jul. 13, 2000

(30) Foreign Application Priority Data

Jul. 14, 1999 (JP) .................................... 11-200724

(51) Int. Cl.$^7$ .................................................. G02B 27/14
(52) U.S. Cl. ............................................ 359/630; 359/631
(58) Field of Search .................................. 359/630, 631, 359/633, 636, 637, 638, 639, 640

(56) References Cited

U.S. PATENT DOCUMENTS

| | | | |
|---|---|---|---|
| 5,596,451 | * | 1/1997 | Handschy et al. .................... 359/633 |
| 5,896,232 | * | 4/1999 | Budd et al. ........................... 359/630 |
| 6,025,890 | * | 2/2000 | Chase ..................................... 349/9 |
| 6,172,777 | * | 1/2001 | Flood et al. ............................ 359/10 |

* cited by examiner

*Primary Examiner*—Ricky Mack
(74) *Attorney, Agent, or Firm*—Frommer Lawrence & Haug LLP; William S. Frommer

(57) ABSTRACT

There is provided a virtual image optical system which removes the noise caused by stray light, removes the aberration, and which can be implemented in a smaller size. The virtual image optical system includes a reflective spatial light modulator, an illuminating light source device, eyepiece optics, and a light source optical system. The light source optical system includes at least one beam splitter. The eyepiece optics include at least one beam splitter and reflector. An angle formed by a plane normal vector formed with respect to the reflector of the eyepiece optics and a plane normal vector formed with respect to the beam splitter is in the range of 136 degrees to 179 degrees.

155 Claims, 29 Drawing Sheets

V = 0

V > Vth

First Voltage Direction

Second Voltage Direction

FIG. 20

Data of Optical System

| Surface Number | Aspheric Surface | Radius of Curvature | Surface Interval | Reflection Mode Refraction Mode | Optical Material, Refractive Index, Abbe Number |
|---|---|---|---|---|---|
| OBJ(Virtual Image) | | ∞ | 1000.000000 | | |
| 1 | | ∞ | 0.000000 | | |
| STO(Pupil) | | ∞ | 0.000000 | | |
| 3 | ASP | 27.24063 | 0.000000 | | n=1.490000, Ab=56.2500 |
| 4 | | ∞ | 0.000000 | | n=1.490000, Ab=56.2500 |
| 5 | ASP | 46.65477 | -37.000000 | REFL | n=1.490000, Ab=56.2500 |
| 6 | | ∞ | 0.000000 | REFL | n=1.490000, Ab=56.2500 |
| 7 | ASP | 19.111799 | -0.500000 | | |
| 8 | | ∞ | -0.220000 | | pol  n=1.5 |
| 9 | | ∞ | -0.800000 | | glass-TFT  n=1.46 |
| 10(SLM) | | ∞ | 0.800000 | REFL | glass-TFT  n=1.46 |
| 11 | | ∞ | 0.220000 | | pol  n=1.5 |
| 12 | | ∞ | 0.500000 | | |
| 13 | ASP | 19.111799 | 5.000000 | | n=1.490000, Ab=56.2500 |
| 14 | | ∞ | -6.000000 | REFL | n=1.490000, Ab=56.2500 |
| 15 | | -50.00000 | -1.000000 | | |
| IMG (Illuminating Light Source) | | ∞ | 0.000000 | | |

FIG. 21

Lens Data

| Surface Number | | | | |
|---|---|---|---|---|
| OBJ (Virtual Image) | XDE : 0.000000<br>ADE : 0.000000 | YDE : 0.000000<br>BDE : 0.000000 | ZDE : 0.000000<br>CDE : 0.000000 | DAR |
| STO (Pupil) | XDE : 0.000000<br>ADE : 0.000000 | YDE : 0.000000<br>BDE : 0.000000 | ZDE : 0.000000<br>CDE : 0.000000 | DAR |
| 3 | K : 0.000000<br>A : 0.684124E-05<br>XDE : 0.000000<br>ADE : 0.000000 | IC : Y<br>B : -0.156653E-08<br>YDE : 0.004678<br>BDE : 0.000000 | C : 0.124457E-09<br>ZDE : -21.000000<br>CDE : 0.000000 | D : -0.641464E-12<br>GLB G1 |
| 4 | XDE : 0.000000<br>ADE : 35.000000 | YDE : 0.000000<br>BDE : 0.000000 | ZDE : -25.000000<br>CDE : 0.000000 | GLB G1 |
| 5 | K : -1.000000<br>A : 0.140285E-05<br>XDE : 0.000000<br>ADE : 0.000000 | IC : Y<br>B : -0.418190E-09<br>YDE : -0.000827<br>BDE : 0.000000 | C : 0.347916E-11<br>ZDE : -37.500000<br>CDE : 0.000000 | D : -0.773374E-14<br>GLB G1 |
| 6 | XDE : 0.000000<br>ADE : 35.000000 | YDE : 0.000000<br>BDE : 0.000000 | ZDE : -25.000000<br>CDE : 0.000000 | GLB G1 |
| 7 | K : 0.000000<br>A : -0.166398E-03<br>XDE : 0.000000<br>ADE : 70.000000 | IC : Y<br>B : -0.128071E-05<br>YDE : -15.035082<br>BDE : 0.000000 | C : 0.334021E-07<br>ZDE : -30.469652<br>CDE : 0.000000 | D : -0.175631E-09<br>GLB G1 |
| 13 | K : 0.000000<br>A : -0.166398E-03<br>XDE : 0.000000<br>ADE : 70.000000 | IC : Y<br>B : -0.128071E-05<br>YDE : 15.035082<br>BDE : 0.000000 | C : 0.334021E-07<br>ZDE : -30.469652<br>CDE : 0.000000 | D : -0.175631E-09<br>GLB G1 |
| 14 | XDE : 0.000000<br>ADE : 45.000000 | YDE : 0.000000<br>BDE : 0.000000 | ZDE : 0.000000<br>CDE : 0.000000 | BEN |
| IMG (Illuminating Light Source) | XDE : 0.000000<br>ADE : 0.000000 | YDE : 0.000000<br>BDE : 0.000000 | ZDE : 0.000000<br>CDE : 0.000000 | DAR |

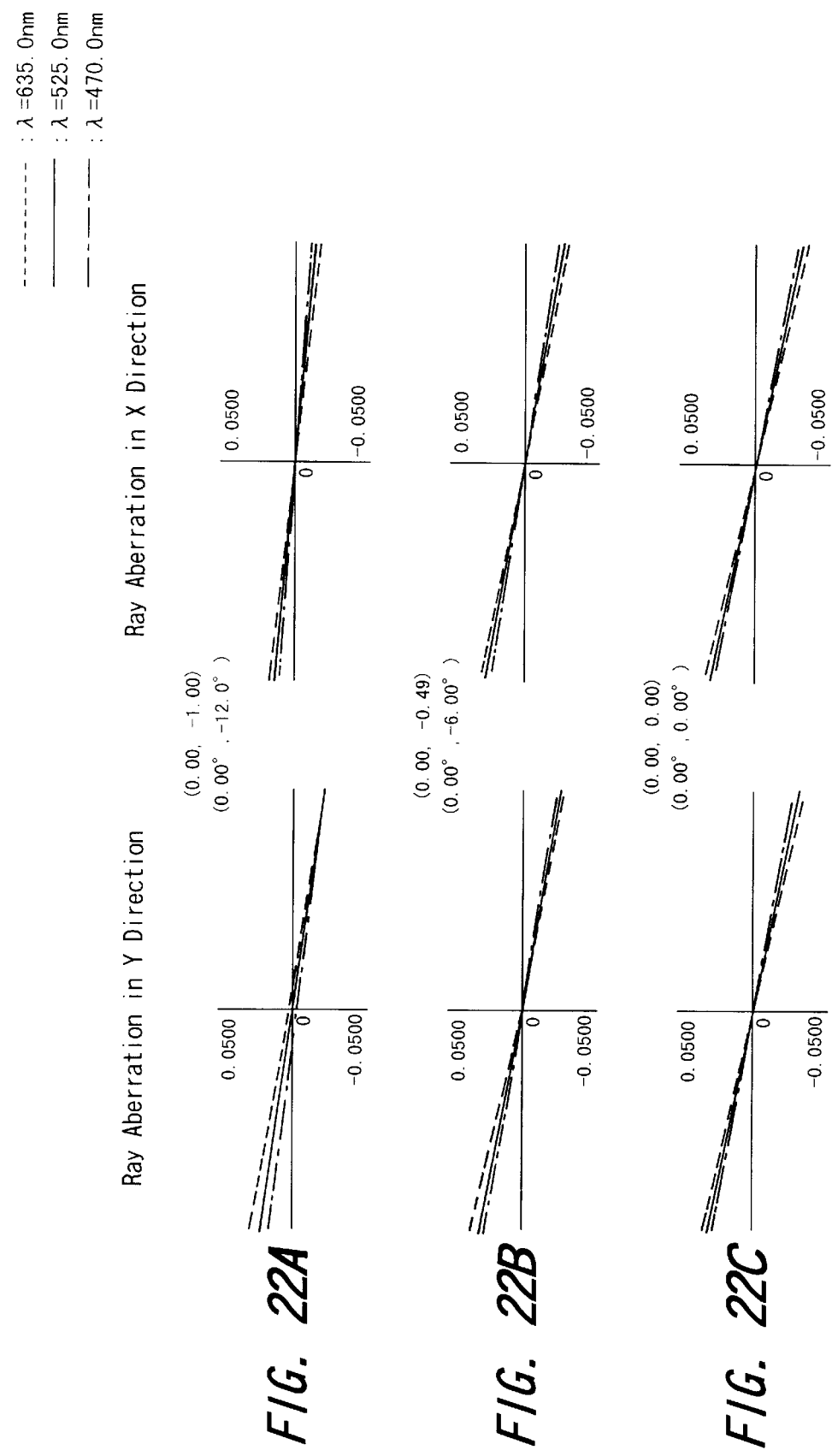

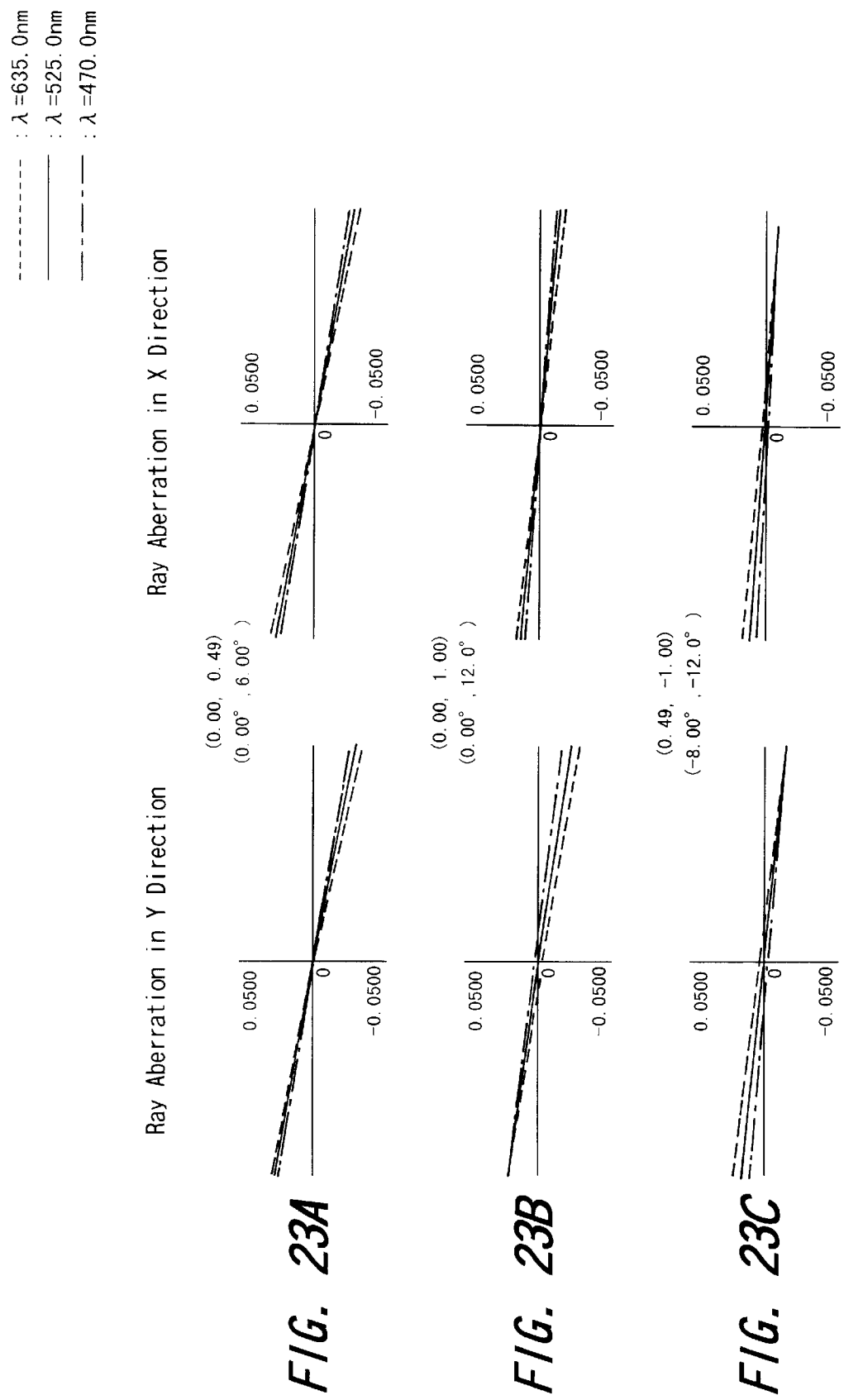

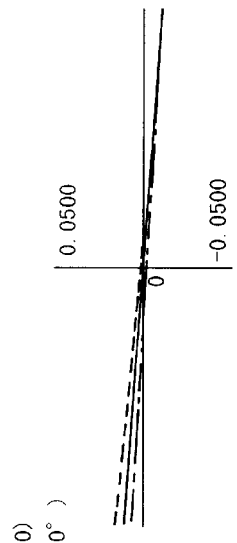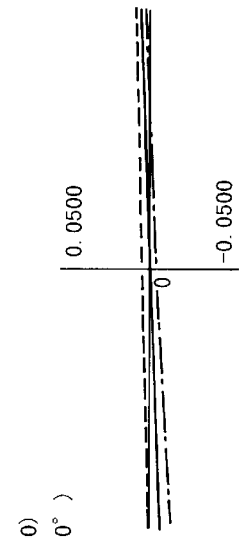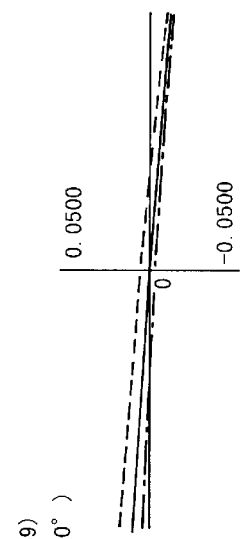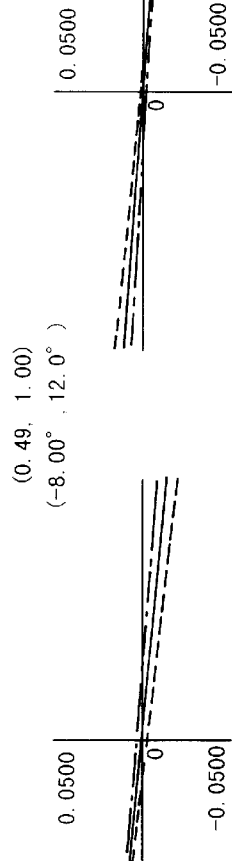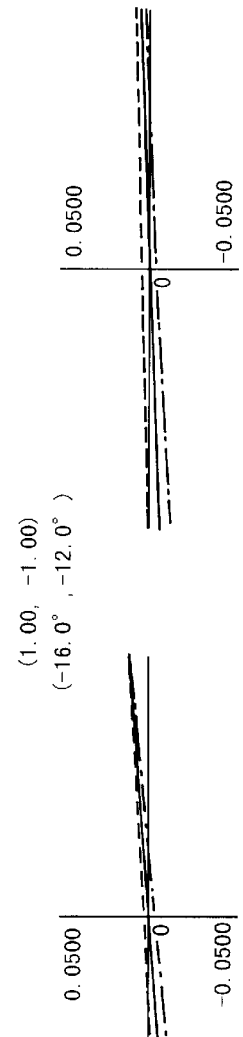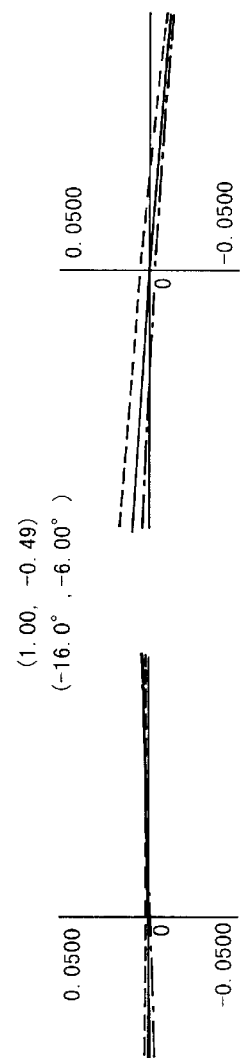
FIG. 25A  FIG. 25B  FIG. 25C

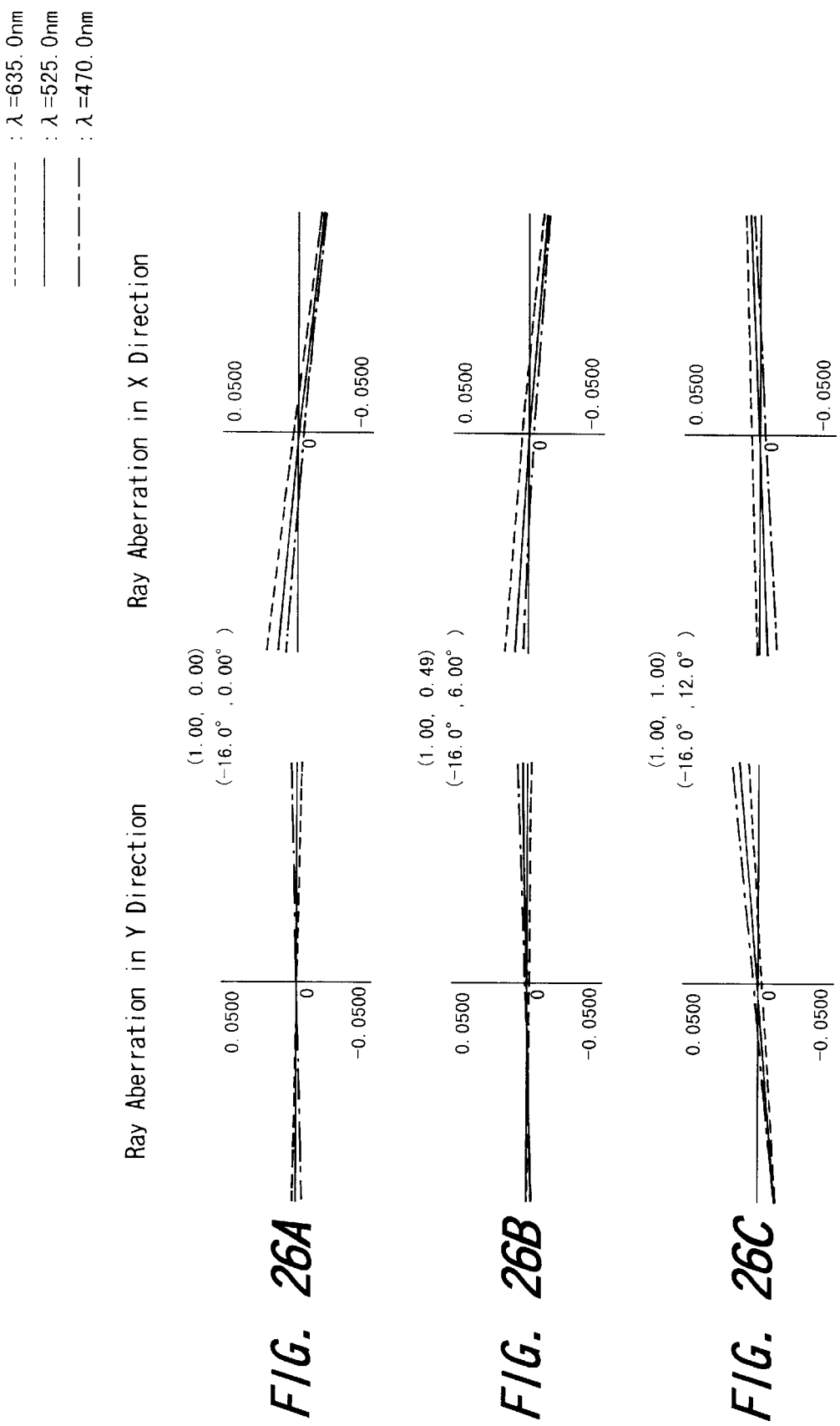

VIRTUAL IMAGE OPTICAL SYSTEM

BACKGROUND OF THE INVENTION

1. Field of the Invention

The present invention relates to a virtual image optical system suitable for use in view finders of video cameras, head mount displays or the like. In particular, the present invention relates to a virtual image optical system using a reflective spatial light modulator.

2. Description of the Related Art

The spatial light modulator (SLM) is a device which is applied to be supplied with a video signal and to modulate light on every pixel on the basis of image data of the video signal.

The spatial light modulators can be classified into a transmission type which modulates light transmitted by the spatial light modulator and a reflection type which modulates light reflected by the spatial light modulator. The virtual image optical system of the present invention uses the latter reflective spatial light modulator.

The spatial light modulators use liquid crystal, digital micro mirrors, or the like. Especially, spatial light modulators using liquid crystal are referred to as liquid crystal spatial light modulators.

The liquid crystal can be classified to twisted nematic mode type, birefringence mode type, and light dispersion mode type, and light absorption mode type.

As typically used liquid crystal, there are TN liquid crystal using the twisted nematic (TN) operation mode of the twisted nematic mode type, STN liquid crystal using the super twisted nematic (STN) operation mode of the birefringence operation mode type, and FLC liquid crystal using the ferroelectric liquid crystal (FLC) operation mode.

By referring to FIG. 1, the structure and operation principle of a reflective spatial light modulator using the TN liquid crystal or the STN liquid crystal will now be described.

A TN or STN liquid crystal reflective spatial light modulator 90 includes a pair of electrode portion, a liquid crystal material 95 inserted between the electrode portion, and a lower reflector 96.

The upper electrode portion includes a glass substrate 91A, a transparent electrode 92A disposed inside (under) the glass substrate 91A, and an alignment layer 93A disposed inside (under) the transparent electrode 92A. The lower electrode portion includes a glass substrate 91B, a transparent electrode 92B disposed inside (on) the glass substrate 91B, and an alignment layer 93B disposed inside (on) the transparent electrode 92B.

A polarizer 94A is disposed outside (on) the glass substrate 91A of the upper electrode portion. An analyzer 94B is disposed outside (under) the glass substrate 91B of the lower electrode portion.

Directions of the polarization of the two polarizers 94A and 94B are perpendicular to each other.

Each of the alignment layers 93A and 93B has a function of aligning the alignment direction of molecules of the liquid crystal material 95. The alignment direction of the alignment layer 93A disposed in the upper electrode portion is parallel to the polarization direction of the polarizer 94A disposed in the upper electrode section. The alignment direction of the alignment layer 93B disposed in the lower electrode portion is parallel to the polarization direction of the analyzer 94B disposed in the lower electrode portion.

In other words, the alignment directions of the two alignment layers 93A and 93B are perpendicular to each other.

FIG. 1A shows a voltage non-application state in which a voltage is not applied to each of the transparent electrodes 92A and 92B. FIG. 1B shows a voltage application state in which a voltage is applied to each of the transparent electrodes 92A and 92B.

In the voltage non-application state of FIG. 1A, the alignment of molecules of the liquid crystal material 95 comes in a twisted state. In the voltage application state of FIG. 1B, molecules of the liquid crystal material 95 come in a aligned state in the vertical direction.

In the case of TN liquid crystal, the twist angle of molecules in the voltage non-application state is 90 degrees.

In the voltage non-application state of FIG. 1A, polarized light 97A fed from the upper polarizer 94A is rotated in direction of the polarization by passing through the liquid crystal material 95.

Therefore, this polarized light 97B is passed through the lower polarizer 94B and arrives at the reflector 96.

In the same way, polarized light 97C reflected by the reflector 96 is rotated in direction of the polarization by passing through the liquid crystal material 95, and the polarized light 97C is passed through the upper polarizer 94A.

In other words, the polarized light 97C returns to the same path as the incident light.

In the voltage application state of FIG. 1B, the polarized light 97A fed from the upper polarizer 94A is not rotated in direction of the polarization by passing through the liquid crystal material 95.

Therefore, this polarized light cannot be passed through the lower polarizer 94B, and does not arrive at the reflector 96.

In other words, reflected light for the incident light is not obtained.

By referring to FIGS. 2A to 2C, the structure and operation principle of a reflective spatial light modulator using FLC will now be described.

An FLC reflective spatial light modulator 100 includes a pair of electrode portions, and a liquid crystal material 105 inserted between the electrode portions.

The upper electrode portion includes a glass substrate 101A, a transparent electrode 102A disposed inside (under) the glass substrate 101A, and an alignment layer 103A disposed inside (under) the transparent electrode 102A. The lower electrode portion includes a silicon substrate 101B, an aluminum electrode 102B disposed inside (on) the silicon substrate 101B, and an alignment layer 103B disposed inside (on) the aluminum electrode 102B.

The aluminum electrode 102B functions as a reflective layer as well.

A polarizer 104 is disposed outside (on) the glass substrate 101A of the upper electrode portion.

FIG. 2A shows a first voltage direction state in which a voltage in a first direction is applied to each of the transparent electrode 102A and the aluminum electrode 102B. FIG. 2B shows a second voltage direction state in which a voltage in a second direction is applied to each of the transparent electrode 102A and the aluminum electrode 102B.

As shown in FIG. 2C, the liquid crystal material 105 does not exhibit a birefringence effect to the incident polarized light in the first voltage direction state, but the liquid crystal material 105 exhibits a birefringence effect to the incident polarized light in the second voltage direction state.

In the first voltage direction state of FIG. 2A, the liquid crystal material 105 does not exhibit a birefringence effect, and consequently the polarized light 107A fed from the polarizer 104 is passed through the liquid crystal material 105 and arrives at the aluminum electrode (reflective layer) 102B without changing the state of polarization.

The polarized light 107B reflected by the aluminum electrode (reflective layer) 102B is passed though the liquid crystal material 105 again and arrives at the polarizer 104 without changing the state of polarization.

In other words, the light having the same polarization state as that of the incident light returns to the polarizer 104.

As a result, exit light is obtained from the polarizer 104.

On the other hand, in the second voltage direction state of FIG. 2B, the polarized light 107A fed from the polarizer 104 is subjected to a birefringence effect when it is passed through the liquid crystal material 105, and consequently linearly polarized light is changed to circularly polarized light.

The circularly polarized light is reflected by the aluminum electrode (reflective layer) 102B and thus the rotation direction of the circularly polarized light 107B becomes reverse.

The circularly polarized light 107B with reverse rotation direction is subjected to a birefringence effect when it is passed through the liquid crystal material 105 again, and consequently the circularly polarized light 107B is changed to a linearly polarized light.

This linearly polarized light is perpendicular to the polarization direction of the polarizer 104 and therefore is not passed through the polarizer 104.

FIG. 3 shows an example of a virtual image optical system having a reflective spatial light modulator which uses FLC (ferroelectric liquid crystal).

This virtual image optical system includes an FLC reflective spatial light modulator 100, a polarizer 104, a half mirror 111, and an analyzer 112.

The polarization direction of the polarizer 104 and the polarization direction of the analyzer 112 are perpendicular to each other.

The FLC reflective spatial light modulator 100 is the same as the FLC reflective spatial light modulator shown in FIGS. 2A and 2B, and its detailed description will be omitted.

The spatial light modulator is typically used together with an illuminating light source device.

Light 107A fed from an illuminating light source device which is not illustrated arrives at the half mirror 111 via the polarizer 104.

The light 107A reflected by the half mirror 111 arrives at the half mirror 111 again via the FLC reflective spatial light modulator 100.

Polarized light 107B passed through the half mirror 111 arrives at the analyzer 112.

In the first voltage direction state, the liquid crystal material 105 does not exhibit a birefringence effect as described above. Therefore, the polarized light 107A fed from the polarizer 104 arrives at the analyzer 112 without changing the state of polarization.

Therefore, light fed from the illuminating light source device is not passed through the analyzer 112.

In the second voltage direction state, however, the liquid crystal material 105 exhibits a birefringence effect. Polarized light 107B fed from the polarizer 104 is changed in polarization state, and arrives at the analyzer 112.

Therefore, light fed from the illuminating light source device is passed through the analyzer 104 and is outputted.

The reason why an illuminating light source device is used is that normally black should be formed when light from the illuminating light source device is not subjected to the birefringence effect by the liquid crystal material 105.

This is because the phase difference generated by the birefringence effect of the liquid crystal material 105 depends upon the layer thickness of the liquid crystal material 105 and the incidence angle of the incident light.

By referring to FIG. 4, an example of a conventional virtual image optical system using a reflective spatial light modulator will now be described.

This example is described in U.S. Pat. No. 5596451. For details, see the U.S. Patent.

The virtual image optical system of the present example has a polarization beam splitter cube 125 (hereafter simply referred to as a cube). A polarization beam splitter 125E is formed on a diagonal plane of the cube 125.

As illustrated, an illuminating light source device 121 and a polarizer 123 are disposed so as to correspond to a first plane 125A of the cube 125. A reflective spatial light modulator 122 is disposed so as to correspond to a second plane 125B. A quarter wave/undulation plate 126 and a reflective mirror 127 are disposed so as to correspond to a third plane 125C.

Light fed from the illuminating light source device 121 is passed through the polarizer 123, and deflected by the polarization beam splitter 125E. The light fed from the illuminating light source device 121 thus arrives at the reflective spatial light modulator 122.

Modulated reflected light is outputted from the reflective spatial light modulator 122.

This reflected light is passed through the polarization beam splitter 125E and the quarter wave/undulation plate 126, and reflected by a concave reflective surface of the reflective mirror 127.

This reflected light is passed through the quarter wave/undulation plate 126 again, and deflected by the polarization beam splitter 125E as represented by 128A. Thus the reflected light arrives at a human pupil 131 in a viewing area 130.

The virtual image optical system of the present example has the following drawbacks.

(1) As represented by a broken line 128B, a part of light fed from the illuminating light source device 121 directly arrives at the pupil 131 as stray light.

This stray light 128B becomes noise of image data displayed by the reflective spatial light modulator 122, and lowers the contrast of the image information.

(2) The polarization beam splitter cube 125 of a cubic shape is used. Therefore, the incidence plane 125A of light fed from the illuminating light source device 121 is planar. The plane 125B corresponding to the reflective spatial light modulator 122, and the plane 125C corresponding to the quarter wave/undulation plate 126 and the reflective mirror 127 are also planar. A plane 125D through which light exits toward the viewing area 130, and the polarization beam splitter plane 125E are also planar. There are few planes having a degree of optical freedom.

For example, in the case where the pixel pitch of the reflective spatial light modulator 122 is small, therefore, a sufficient resolution cannot be obtained.

(3) In the case where it is assumed that the dimensions of the reflective spatial light modulator 122 are fixed, the angle of view must be made large for making the dimensions of the apparent display screen large.

If the angle of view is made large, the focal length f becomes small.

If the focal length f is made smaller, the absolute value of the Petzval sum PS becomes large.

In other words, the field curvature becomes large.

The Petzval sum PS is a parameter representing the field flatness or field curvature of the image. As represented by the following equation, the Petzval sum PS is a function of the refractive index n and the focal length f.

$$PS = \Sigma(1/nf) \quad (1)$$

If the Petzval sum is zero, i.e., PS=0, then it is meant that the image is flat.

The larger the absolute value of the the Petzval sum is, the larger value the field curvature of the image has.

In the example of FIG. 4, only the concave reflective surface of the reflective mirror 127 bears the refractive power of the whole optical system, and n=−1 and f>0.

Therefore, the Petzval sum becomes PS<0.

(4) Since the polarization beam splitter cube and the reflective mirror are separate components, the number of components increases and the manufacturing cost becomes high.

Furthermore, since there is an air layer between the cube and the reflective mirror, the focal length becomes long as compared with the case where there is no air layer.

(5) Since the polarization beam splitter cube is high in manufacturing cost and heavy in weight, the manufacturing cost and the weight of the system increase.

By referring to FIG. 5, another example of conventional virtual image optical system using a reflective spatial light modulator will now be described.

This example is also described in U.S. Pat. No. 5,596,451. For details, see the U.S. Patent.

The virtual image optical system of the present example has such a configuration that a cube-shaped polarization beam splitter cube 124 (hereafter simply referred to as a cube) having small dimensions is additionally provided in the virtual image optical system described with reference to FIG. 4.

The cube 124 having small dimensions has a configuration similar to that of the cube 125 having large dimensions. A polarization beam splitter 124E is formed on a diagonal plane of the cube 124.

As illustrated, an illuminating light source device 121 is disposed so as to correspond to a first plane 124A of the cube 124 having small dimensions. A reflective spatial light modulator 122 is disposed so as to correspond to a second plane 124B. The cube 125 having large dimensions is disposed so as to correspond to a third plane 124C. A quarter wave/undulation plate 126 and a reflective mirror 127 are disposed so as to correspond to a third plane 125C of the cube 125 having large dimensions.

Light fed from the illuminating light source device 121 is deflected by the polarization beam splitter 124E of the small cube 124. The light fed from the illuminating light source device 121 thus arrives at the reflective spatial light modulator 122.

Modulated reflected light is outputted from the reflective spatial light modulator 122.

This reflected light is passed through the two polarization beam splitters 124E and 125E and the quarter wave/undulation plate 126, and reflected by a concave reflective surface of the reflective mirror 127.

This reflected light is passed through the quarter wave/undulation plate 126 again, and deflected by the polarization beam splitter 125E as represented by 128A. Thus the reflected light arrives at a human pupil 131 in a viewing area 130.

In the virtual image optical system of the present example, a part of light fed from the illuminating light source device 121 is passed through the polarization beam splitter 124E as represented by a broken line 128B, but it does not arrive at the viewing area 130.

Therefore, noise is not generated in the image data by stray light.

In the present example, therefore, the first drawback (1) among the above-described three drawbacks is avoided. However, other drawbacks still remain.

By referring to FIGS. 6A and 6B, another example of conventional virtual image optical system will now be described.

The virtual image optical system shown in FIG. 6A includes an illuminating light source device 141, an FLC reflective spatial light source device 142A, a polarization beam splitter 143, and a concave reflective mirror 144.

The polarization beam splitter 143 of the present example has such a structure that a polarization beam splitter layer is applied onto a glass substrate.

In the virtual image optical system shown in FIG. 6B, a TN liquid crystal reflective spatial light modulator 142B is used as the spatial light modulator, and further a quarter wave/undulation plate 145 is disposed between the polarization beam splitter 143 and the concave reflective mirror 144.

Light fed from the illuminating light source device 141 arrives at the reflective spatial light modulators 142A or 142B via the polarization beam splitter 143.

The light fed from the reflective spatial light modulators 142A or 142B is deflected by the polarization beam splitter 143, and reflected by the reflective mirror 144. The light thus arrives at a human pupil 131 in a viewing area 130.

In the example of FIGS. 6A and 6B, a platelike polarization beam splitter 143 is used instead of the cube-shaped polarization beam splitter cube.

Therefore, the above-described fifth drawback is avoided.

However, this example has the following drawbacks.

(1) In the case where dimensions of the optical systems are the same, the focal length of the reflective mirror which generates the refractive power becomes longer and the optical magnification becomes smaller as compared with the case where the cube is used.

If the optical magnification becomes smaller, dimensions of the apparent displayed image become smaller.

In the case where the virtual image distance is infinite, the focal length for focusing a virtual image is a value obtained by dividing a physical distance between the reflective spatial light modulator and the principal point of the reflective mirror by the refractive index of a medium between them.

(2) In the platelike polarization beam splitter, it is difficult to make both the P- and S-polarization transmission factors high in the whole visible light band.

Even if the reflective TN liquid crystal spatial light modulator is used as the reflective spatial light modulator and the quarter wave/undulation plate is disposed between the reflective mirror and the polarization beam splitter as in the example shown in FIG. 6B, the light utilization efficiency cannot be made sufficiently high.

(3) For example, as compared with the polarization beam splitter of internal filling type in which the configuration surfaces can be made curved surfaces, there are fewer surfaces having a degree of optical freedom.

In some cases, therefore, resolution and aberration correction such as field curvature cannot be achieved sufficiently.

By referring to FIG. 7, another example of conventional virtual image optical system will now be described.

The virtual image optical system of the present example includes an illuminating light source device 10, an optical film 15, a reflective spatial light modulator 20, first and second half mirrors 21 and 22, and a concave reflective mirror 23.

The virtual image optical system further includes a control circuit. The control circuit includes a system controller 2 supplied with a video signal 1, an illuminating light source device drive circuit 4 supplied with a signal fed from the system controller 2, and a reflective spatial light modulator drive circuit 6 supplied with a signal fed from the system controller 2.

On the basis of a signal fed from the system controller 2, the illuminating light source device drive circuit 4 supplies a light source drive signal to the illuminating light source device 10. On the basis of a signal fed from the system controller 2, the reflective spatial light modulator drive circuit 6 supplies a drive signal to the reflective spatial light modulator 20.

The illuminating light source device 10 includes a light source 11, a reflector 12, a light pipe 13, and a reflector 14.

Light fed from the light source 11 is led into the light pipe 13 directly or by being reflected by the reflector 12.

A part of the light led into the light pipe 13 directly exits through a front surface 13A. However, the remaining part is reflected by two surfaces 13A, 13B, and the reflector 14 repetitively and thereafter exists through the front surface 13A.

By making the section of the light pipe 13 wedge-shaped, the intensity of light which exits from the front surface 13A of the light pipe 13 is made uniform from the area near the light source 11 to the area located far therefrom.

The light from the light pipe 13 arrives at the optical film 15.

The optical film 15 has a function of controlling the divergence angle DA of a beam from the light pipe 13. Its performance is represented by a half divergence angle HDA.

The half divergence angle HDA is an angle equivalent to half of a solid angle at which the light intensity becomes half of its peak value.

Light passed through the optical film 15 is reflected by the first half mirror 21 to arrive at the reflective spatial light modulator 20 and modulated by the reflective spatial light modulator 20.

Light fed from the reflective spatial light modulator 20 is passed through the first half mirror 21, reflected by the second half mirror 22, reflected by the concave reflective mirror 23, passed through the second half mirror 22, and arrives at a pupil 131 in a viewing area 130.

FIG. 8 is a diagram schematically showing the optical system of the virtual image optical system of FIG. 7.

By referring to FIG. 8, the optical system of the virtual image optical system of FIG. 7 will now be described in detail.

As evident from FIG. 8, the optical system of the virtual image optical system basically includes a light source optical system and eyepiece optics.

The light source optical system includes a beam splitter, i.e., a first half mirror 21, for leading light fed from an illuminating light source device 10 into a reflective spatial light modulator 20.

The eyepiece optics includes a beam splitter, i.e., a second half mirror 22, for deflecting light fed from the reflective spatial light modulator 20, and a reflector, i.e., a concave reflector 23.

An angle formed by the reflective spatial light modulator 20 and the beam splitter of the light source optical system, i.e., the first half mirror 21 is denoted by α.

A point of intersection of a ray passing through a center of the reflective spatial light modulator 20, i.e., a chief ray and the beam splitter of the eyepiece optics, i.e., the second half mirror 22 is denoted by P. Furthermore, a point of intersection of the chief ray and the reflector, i.e., the concave reflective mirror 23 is denoted by Q.

A plane normal vector at the point P is denoted by A. A plane normal vector at the point Q is denoted by B. An angle formed by the two vectors A and B is denoted by β.

In the present example, α is 45 degrees and β is 135 degrees.

Furthermore, as illustrated, an angle formed by the vector B and the beam splitter 22 of the eyepiece optics is 45 degrees.

A distance between the point Q on the reflector 23 of the eyepiece optics and the point P on the beam splitter 22 is denoted by f1'. A distance between the reflective spatial light modulator 20 and the point P on the beam splitter 22 is denoted by f2'.

A focal length f' of the reflector, i.e., the concave reflector 23 is equal to the sum of these two distances.

$$f'=f1'+f2' \qquad (2)$$

A distance between the point Q on the reflector 23 of the eyepiece optics and a bottom end of the beam splitter, i.e., the second half mirror 22 is denoted by L'. A distance between the bottom end of the second half mirror 22 and a pupil O in the viewing area 130 is denoted by R'.

The distance L' represents the thickness of the optical system. The distance R' represents a design distance between an eye and the optical system, i.e., an eye relief.

This example has a drawback that the focal distance f' is comparatively long.

Furthermore, the above-described angle β between the two vectors A and B is comparatively small. It is, for example, 135 degrees.

As a result, the thickness distance L' of the optical system cannot be made small.

Furthermore, the eye relief or the distance R' cannot be made large.

SUMMARY OF THE INVENTION

An object of the present invention is to minimize the noise of image data caused by stray light in a virtual image optical system using a reflective spatial light modulator.

Another object of the present invention is to make the focal length of the reflector of the eyepiece optics small and make the magnification of the optical system large in a virtual image optical system using a reflective spatial light modulator.

Another object of the present invention is to minimize the thickness of the optical system and make the dimensions of the whole system small in a virtual image optical system using a reflective spatial light modulator.

Still another object of the present invention is to make the eye relief large in a virtual image optical system using a reflective spatial light modulator.

Still another object of the present invention is to reduce the aberration of optical system in a virtual image optical system using a reflective spatial light modulator.

As shown in, for example, FIG. 9, a virtual image optical system according to the present invention includes: a reflective spatial light modulator; an illuminating light source device for providing the reflective spatial light modulator with an illuminating ray; a light source optical system for leading an illuminating ray fed from the illuminating light source device to the reflective spatial light modulator, the light source optical system including a beam splitter; and eyepiece optics for leading an image ray fed from the reflective spatial light modulator to a viewing area, the eyepiece optics including a beam splitter and a reflector. An angle formed by a plane normal vector at a point where a chief ray passing through a center of the reflective spatial light modulator intersects the beam splitter of the eyepiece optics and a plane normal vector at a point where the chief ray intersects the reflector is in the range of 136 degrees to 179 degrees, when a side of ray reflection on each surface of the beam splitter and the reflector of the eyepiece optics is taken as a positive direction of a vector.

According to the present invention, therefore, the angle β formed by a plane normal vector formed with respect to the beam splitter and a plane normal vector formed with respect to the reflector is in the range of 136 degrees to 179 degrees. Accordingly, the angle is larger than the conventional value, such as 135 degrees.

Therefore, the stray light from the illuminating light source device does not arrive at the viewing area.

Furthermore, the dimensions of the optical system can be made smaller than those of the conventional virtual image optical system.

As shown in, for example, FIG. 11, a virtual image optical system according to the present invention includes: a reflective spatial light modulator; an illuminating light source device for providing the reflective spatial light modulator with an illuminating ray; a light source optical system for leading an illuminating ray fed from the illuminating light source device to the reflective spatial light modulator; and eyepiece optics for leading an image ray fed from the reflective spatial light modulator to a viewing area. The light source optical system includes a beam splitter for deflecting the illuminating ray fed from the illuminating light source device and leading the illuminating ray to the reflective spatial light modulator. The eyepiece optics include a refractive optical element filled therein with a medium having a refractive index larger than unity. The refractive optical element of the eyepiece optics includes a refractive surface for accepting the image ray fed from the reflective spatial light modulator, a beam splitter surface for deflecting the image ray, and a reflective surface for reflecting light deflected by the beam splitter surface and leading the light to the viewing area.

According to the present invention, the optical system thus includes a refractive optical element. Each surface of the refractive optical element can be made a curved surface, such as a rotationally symmetric surface or an axial symmetric aspheric surface.

As a result, it is possible to provide each surface of the refractive optical element with an aberration correction function and refractive power.

As shown in, for example, FIG. 13, a virtual image optical system according to the present invention includes: a reflective spatial light modulator; an illuminating light source device for providing the reflective spatial light modulator with an illuminating ray; a light source optical system for leading an illuminating ray fed from the illuminating light source device to the reflective spatial light modulator; and eyepiece optics for leading an image ray fed from the reflective spatial light modulator to a viewing area. Each of the light source optical system and the eyepiece optics includes a refractive optical element filled therein with a medium having a refractive index larger than unity. The refractive optical element of the light source optical system includes a first refractive surface for accepting an illuminating ray fed from the illuminating light source device, a second refractive surface for accepting an image ray fed from the reflective spatial light modulator, and a beam splitter surface for deflecting an illuminating ray fed from the illuminating light source device and leading the illuminating ray to the reflective spatial light modulator. The refractive optical element of the eyepiece optics includes a refractive surface for accepting the image ray, a beam splitter surface for deflecting the image ray, and a reflective surface for reflecting light deflected by the beam splitter surface and leading the light to the viewing area.

According to the present invention, the refractive optical element of the light source optical system and the refractive optical element of the eyepiece optics are glued to form a single refractive optical element. Thus, the optical system has an integral structure. As a result, the manufacturing process is simplified, and a virtual image optical system having a compact structure is obtained.

As shown in, for example, FIG. 15, a virtual image optical system according to the present invention includes: a reflective spatial light modulator; an illuminating light source device for providing the reflective spatial light modulator with an illuminating ray; a light source optical system for leading an illuminating ray fed from the illuminating light source device to the reflective spatial light modulator; and eyepiece optics for leading an image ray fed from the reflective spatial light modulator to a viewing area. The light source optical system includes a refractive optical element filled therein with a medium having a refractive index larger than unity. The eyepiece optics include two refractive optical elements each filled therein with a medium having a refractive index larger than unity. The refractive optical element of the light source optical system includes a first refractive surface for accepting an illuminating ray fed from the illuminating light source device, a second refractive surface for accepting an image ray fed from the reflective spatial light modulator, and a beam splitter surface for deflecting an illuminating ray fed from the illuminating light source device and leading the illuminating ray to the reflective spatial light modulator. The first refractive optical element of the eyepiece optics includes a refractive surface for accepting an image ray fed from the refractive optical element of the light source optical system, a beam splitter surface for deflecting the image ray, and a reflective surface for reflecting light deflected by the beam splitter surface and leading the light to the beam splitter surface again. The second refractive optical element of the eyepiece optics includes a first refractive surface for accepting light fed from the team splitter surface of the first refractive optical element of the eyepiece optics, and a second refractive surface for leading light fed from the first refractive surface to the viewing area.

The refractive optical element of the light source optical system and the first and second refractive optical elements of the eyepiece optics are optically closely glued.

According to the present invention, the refractive optical element of the light source optical system and the refractive optical element of the eyepiece optics can be formed of one or two refractive optical elements which are glued to each other. As a result, the assembling process of the virtual image optical system is simplified, and the virtual image optical system is made small in size.

As shown in, for example, FIG. 16, a virtual image optical system according to the present invention includes: a reflective spatial light modulator; an illuminating light source device for providing the reflective spatial light modulator with an illuminating ray; a light source optical system for leading an illuminating ray fed from the illuminating light source device to the reflective spatial light modulator; and eyepiece optics for leading an image ray fed from the reflective spatial light modulator to a viewing area. The light source optical system includes a refractive optical element filled therein with a medium having a refractive index larger than unity. The eyepiece optics include two refractive optical elements each filled therein with a medium having a refractive index larger than unity. The refractive optical element of the light source optical system includes a first refractive surface for accepting an illuminating ray fed from the illuminating light source device, a second refractive surface for accepting an image ray fed from the reflective spatial light modulator, and a beam splitter surface for deflecting an illuminating ray fed from the illuminating light source device and leading the illuminating ray to the reflective spatial light modulator. The first refractive optical element of the eyepiece optics includes a refractive surface for accepting an image ray fed from the refractive optical element of the light source optical system, a beam splitter surface for deflecting the image ray, and a reflective surface for reflecting light deflected by the beam splitter surface and leading the light to the beam splitter surface again. The second refractive optical element of the eyepiece optics includes a first refractive surface for accepting light fed from the beam splitter surface of the first refractive optical element of the eyepiece optics and a second refractive surface for leading light fed from the first refractive surface to the viewing area.

According to the present invention, the optical system includes two refractive optical elements, i.e. the refractive optical element of the light source optical system and the refractive optical element of the eyepiece optics. Thus, the optical system includes a large number of optical surfaces.

Therefore, by making each of these surfaces of the refractive optical elements a curved surface such as a free curved surface, a spheric surface, or an aspheric surface, the aberration can be reduced and the refractive power can be provided.

Furthermore, a polarizer, an analyzer, a quarter wave/undulation plate, or the like can be disposed between the refractive optical elements.

As shown in, for example, FIGS. 17 and 18, a virtual image optical system according to the present invention includes: a reflective spatial light modulator; an illuminating light source device for providing the reflective spatial light modulator with an illuminating ray; a light source optical system for leading an illuminating ray fed from the illuminating light source device to the reflective spatial light modulator; and eyepiece optics for leading an image ray fed from the reflective spatial light modulator to a viewing area. The light source optical system includes a beam splitter for deflecting the illuminating ray fed from the illuminating light source device and leading the illuminating ray to the reflective spatial light modulator. The eyepiece optics include a refractive optical element filled therein with a medium having a refractive index larger than unity. The refractive optical element of the eyepiece optics includes a first refractive surface for accepting an image ray fed from the reflective spatial light modulator, a beam splitter surface for deflecting the image ray, a reflective surface for reflecting the light deflected by the beam splitter surface, and a second refractive surface for leading light fed from the reflective surface to the viewing area. Each of the first and second refractive surfaces is formed so as to become an axial symmetric curved surface having a chief ray passing through a center of the reflective spatial light modulator as a rotation symmetric axis.

According to the present invention, therefore, the eyepiece optics are formed of one refractive optical element. As a result, the assembling process of the virtual image optical system is simplified.

Furthermore, by making the refractive surface and the reflective surface of the refractive optical element of the eyepiece optics curved surfaces, various kinds of aberration can be removed.

BRIEF DESCRIPTION OF THE DRAWINGS

FIG. 20 is a diagram showing data of an optical system of the tenth example of a virtual image optical system according to the present invention;

FIG. 21 is a diagram showing lens data of the tenth example of a virtual image optical system according to the present invention;

FIG. 22 is a diagram showing ray aberration of the tenth example of a virtual image optical system according to the present invention;

FIG. 23 is a diagram showing ray aberration of the tenth example of a virtual image optical system according to the present invention;

FIG. 25 is a diagram showing ray aberration of the tenth example of a virtual image optical system according to the present invention;

FIG. 26 is a diagram showing ray aberration of the tenth example of a virtual image optical system according to the present invention;

DETAILED DESCRIPTION OF THE PREFERRED EMBODIMENTS

Figure 1A:
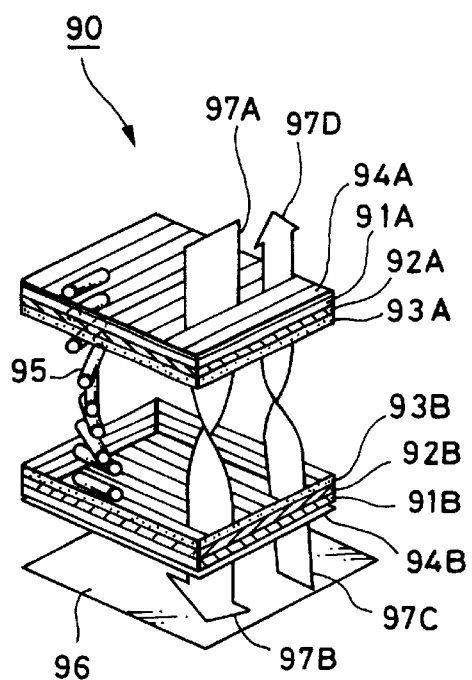
FIGS. 1A and 1B are diagrams showing the configuration and operation of a reflective spatial light modulator using twisted nematic liquid crystal.
Figure 1B:
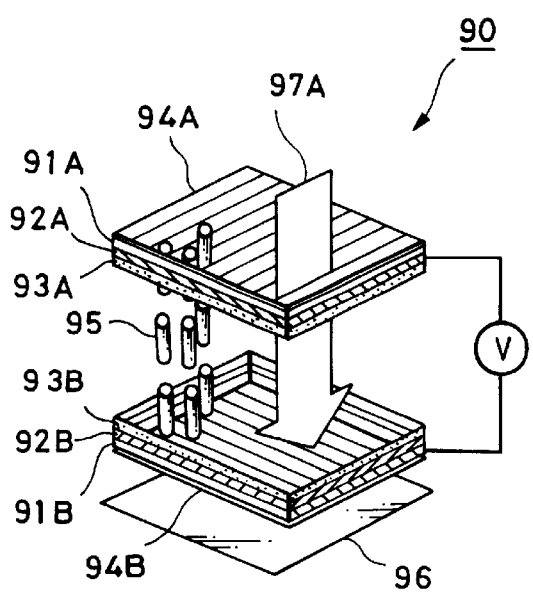
Figure 2A:
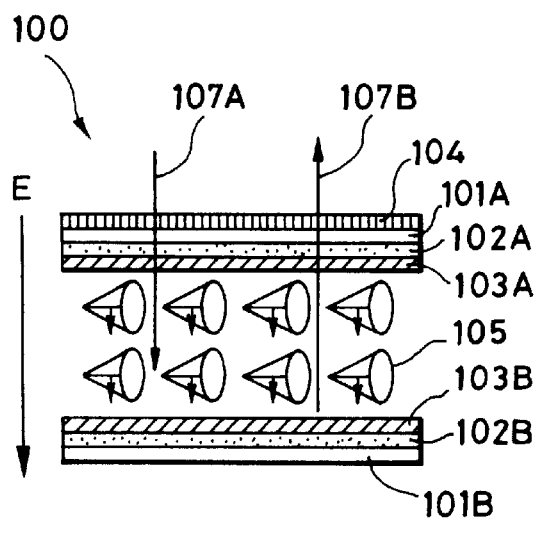
FIGS. 2A, 2B and 2C are diagrams showing the configuration and operation of a reflective spatial light modulator using birefringence liquid crystal (FLC)
Figure 2B:
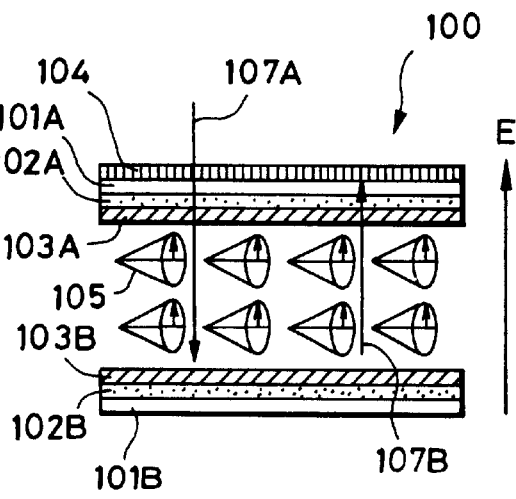
Figure 2C:
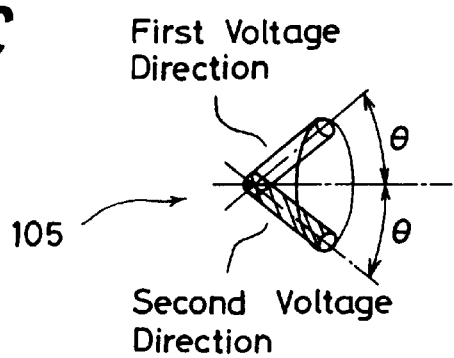
Figure 3:
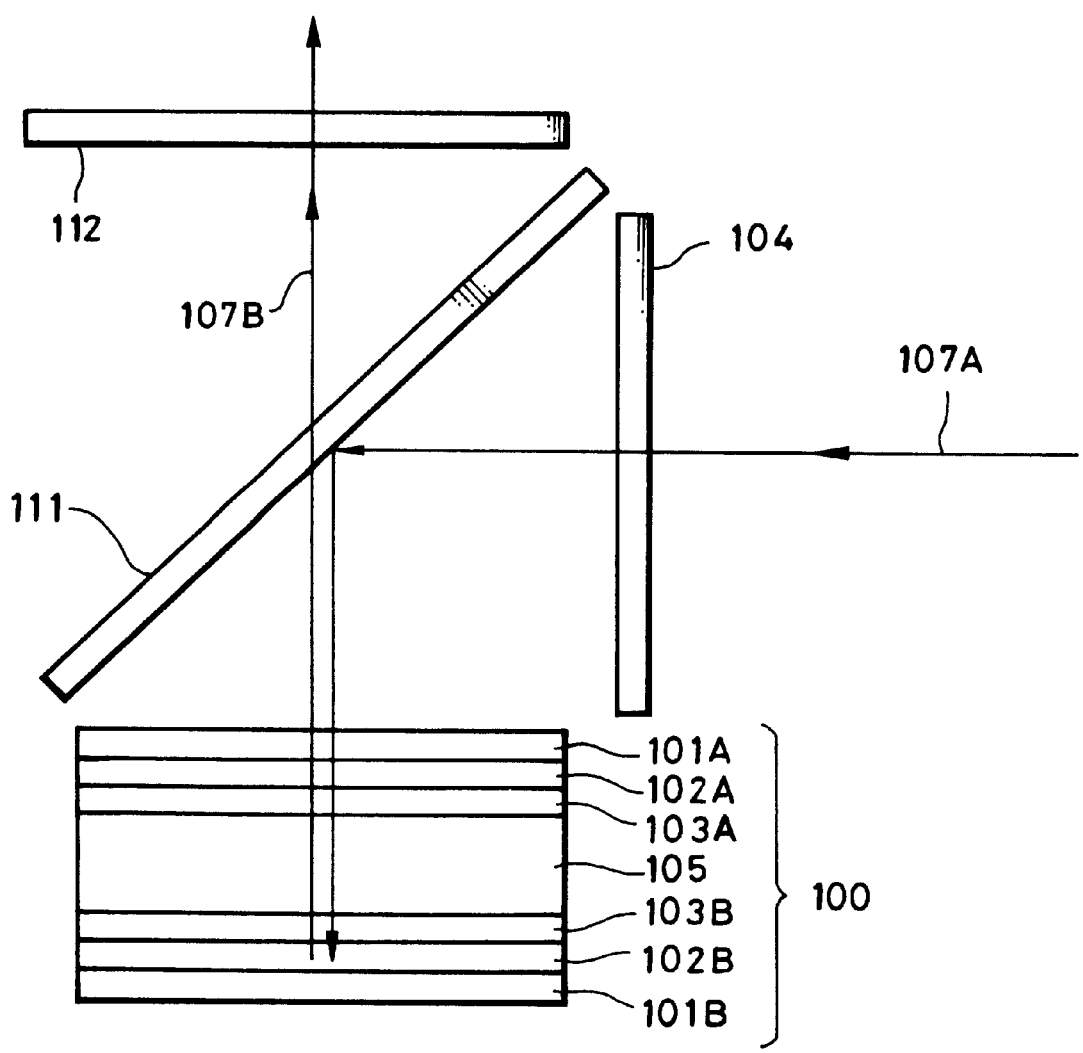
FIG. 3 is a diagram showing the schematic configuration of a conventional virtual image optical system using a reflective spatial light modulator which employs birefringence liquid crystal (FLC)
Figure 4:
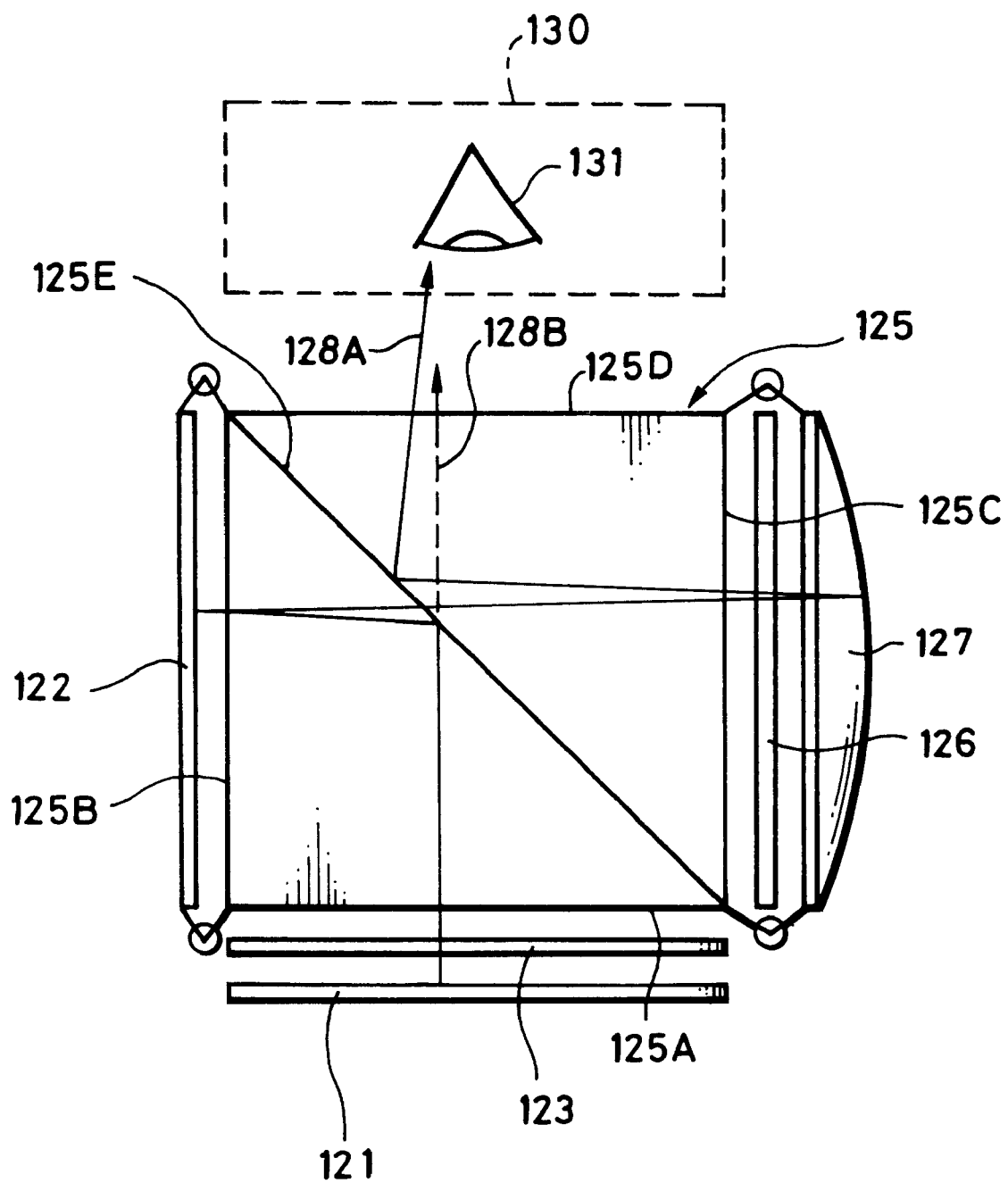
FIG. 4 is a diagram showing a first example of a conventional virtual image optical system.
Figure 5:
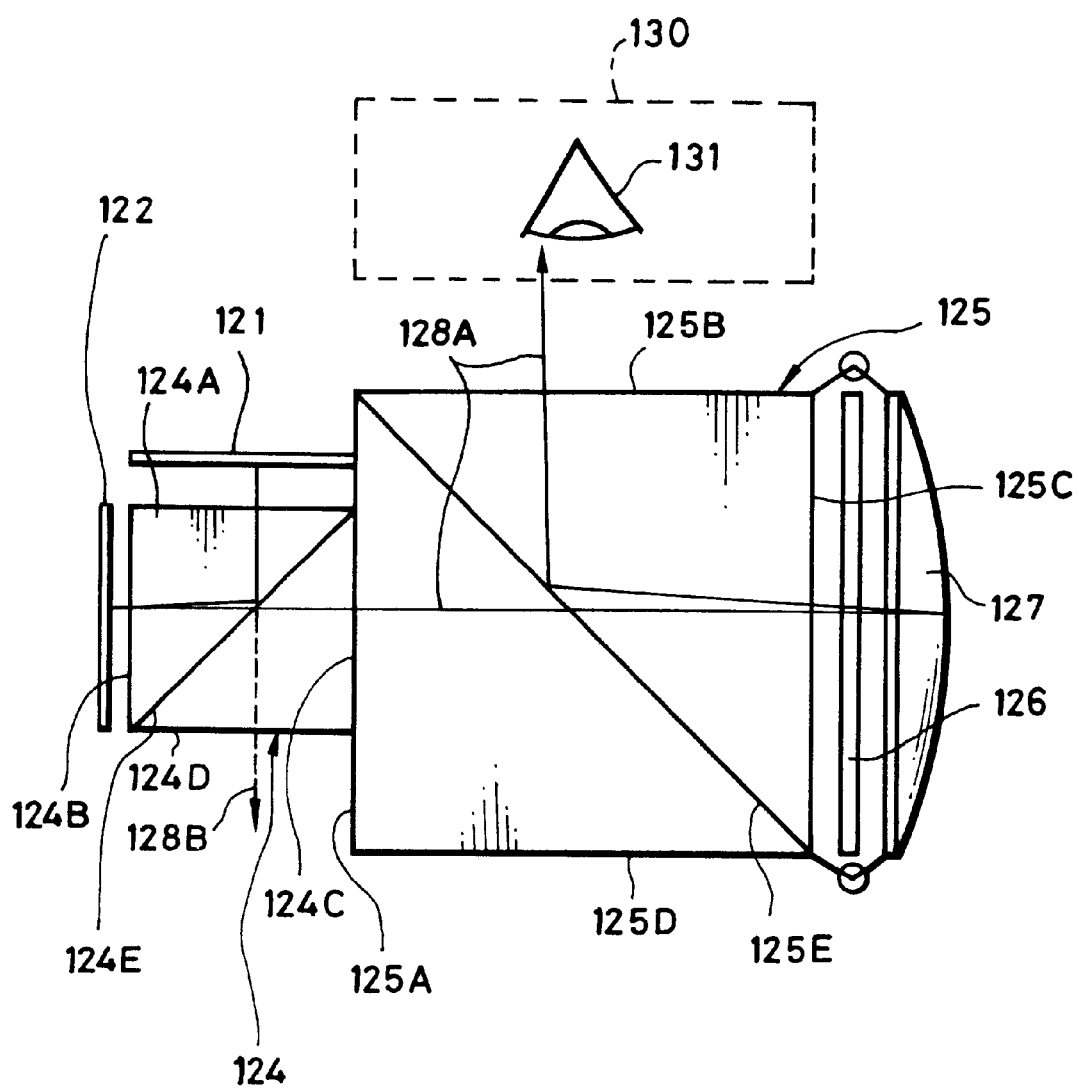
FIG. 5 is a diagram showing a second example of a conventional virtual image optical system.
Figure 6A:
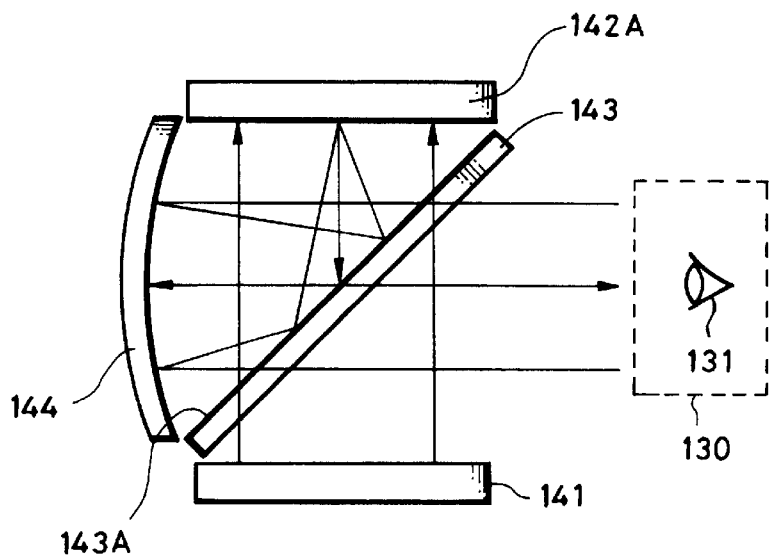
FIGS. 6A and 6B are diagrams showing third and fourth examples of a conventional virtual image optical system.
Figure 6B:
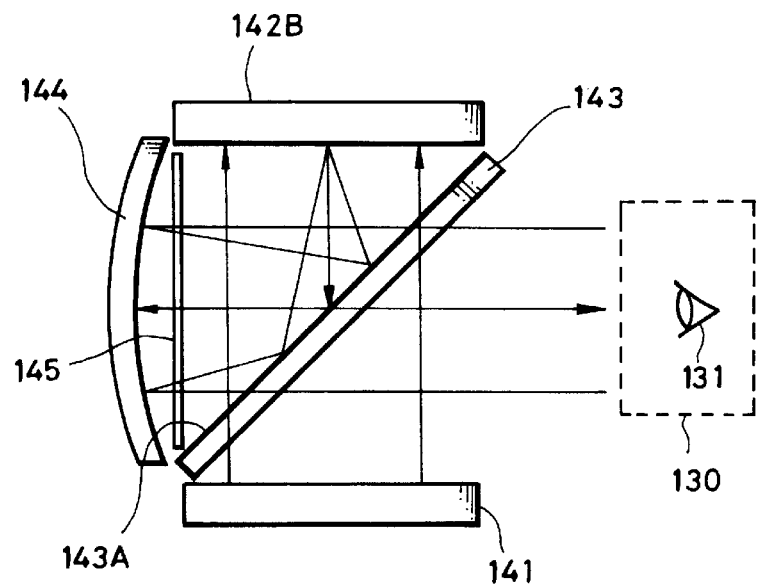

By referring to FIG. 9, a first example of a virtual image optical system according to the present invention will now be described.

The virtual image optical system of the present example includes an illuminating light source device 10, an optical film 15, a reflective spatial light modulator 20, first and second half mirrors 21 and 22, and a concave reflector 23.

Each of the half mirrors 21 and 22 may also be a reflective holographic surface.

A polarization beam splitters may be provided instead of the half mirrors 21 and 22, and a quarter wave/undulation plate may be provided if necessary or desirable.

The concave reflector 23 may also be a reflective holographic surface, and may also be formed so as to be an aspheric surface.

"Aspheric surface" means an axial symmetric aspheric curved surface.

Furthermore, the concave reflector 23 may also be a rotationally asymmetric or free surface.

Although not illustrated, a polarizer and an analyzer may also be provided.

The virtual image optical system further includes a control circuit. The control circuit includes a system controller 2 supplied with a video signal 1, an illuminating light source device drive circuit 4 supplied with a signal fed from the system controller 2, and a reflective spatial light modulator drive circuit 6 supplied with a signal fed from the system controller 2.

The illuminating light source device 10 includes a light source 11, a reflector 12, a light pipe 13, and a reflector 14.

Components of the virtual image optical system of the present example may also be the same as the components of the conventional virtual image optical system described with reference to FIG. 7.

Figure 7:
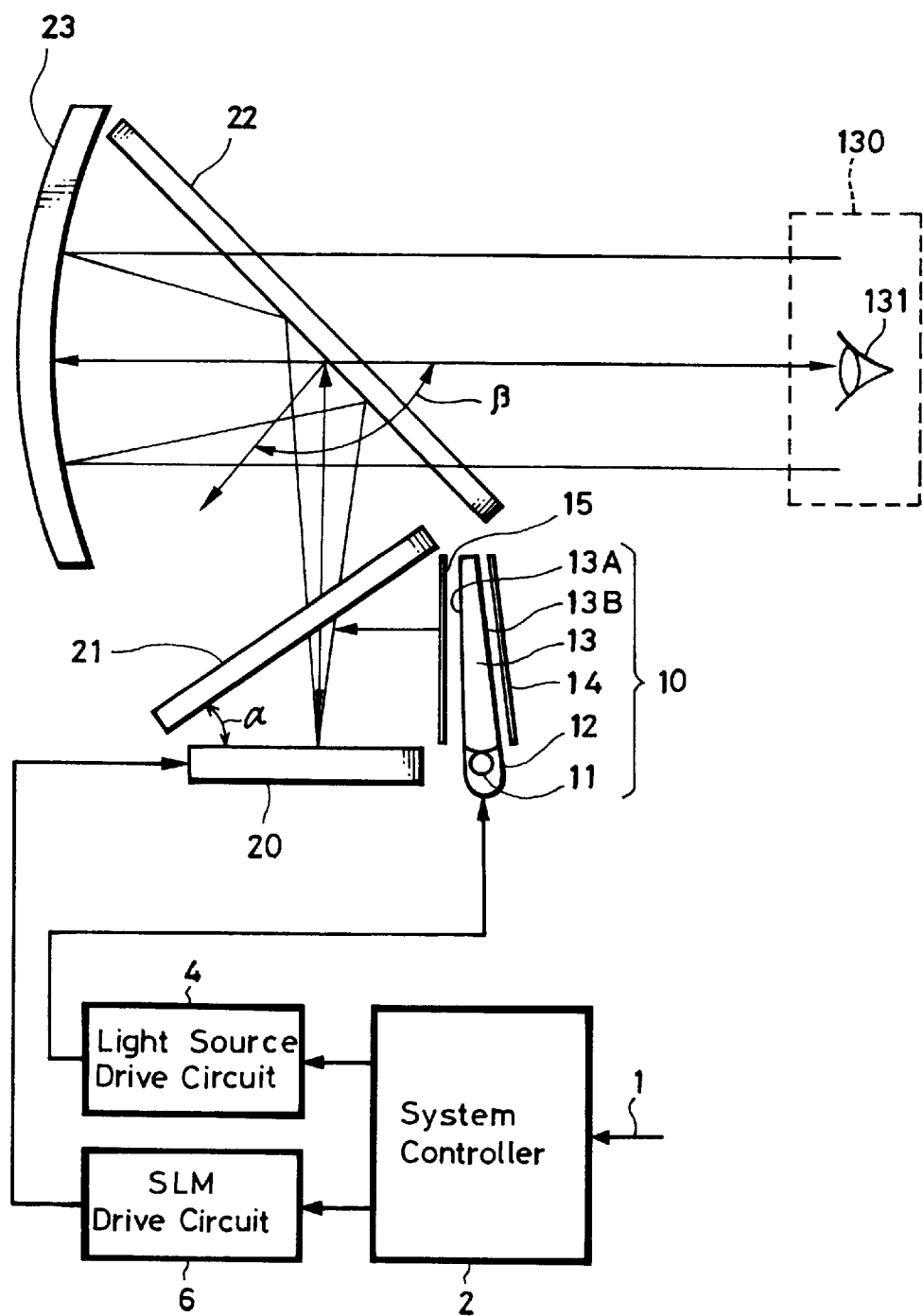
FIG. 7 is a diagram showing a fifth example of a conventional virtual image optical system.

However, relative position relations among the components of the virtual image optical system of the present example are different from those of the conventional example of FIG. 7.

In the same way as the case of the conventional example of FIG. 7, a part of light fed from the illuminating light source device 10 is reflected by the first half mirror 21 and arrives at the reflective spatial light modulator 20. However, the remaining part is passed through the first half mirror 21, arrives at the concave reflector 23, and reflected thereby.

In the present example, however, stray light 200 reflected by the concave mirror 23 does not arrive at a pupil 131 in a viewing area 130.

In the present example, therefore, noise is not generated with respect to image data by the stray light 200.

By referring to FIG. 10, operation of the optical system of the virtual image optical system shown in FIG. 9 will now be described in detail.

Figure 8:
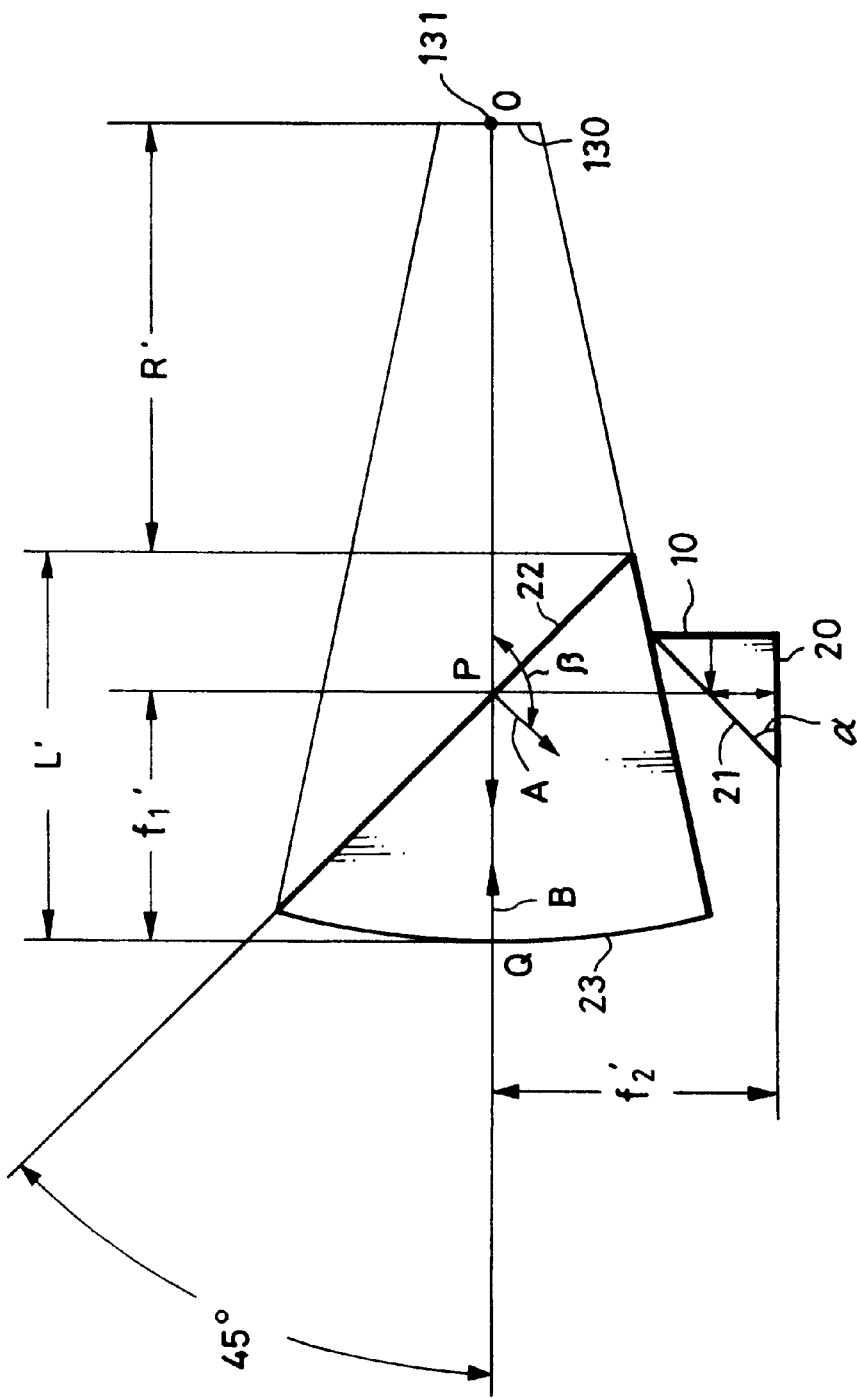
FIG. 8 is a diagram showing details of the fifth example of a conventional virtual image optical system.
Figure 10:
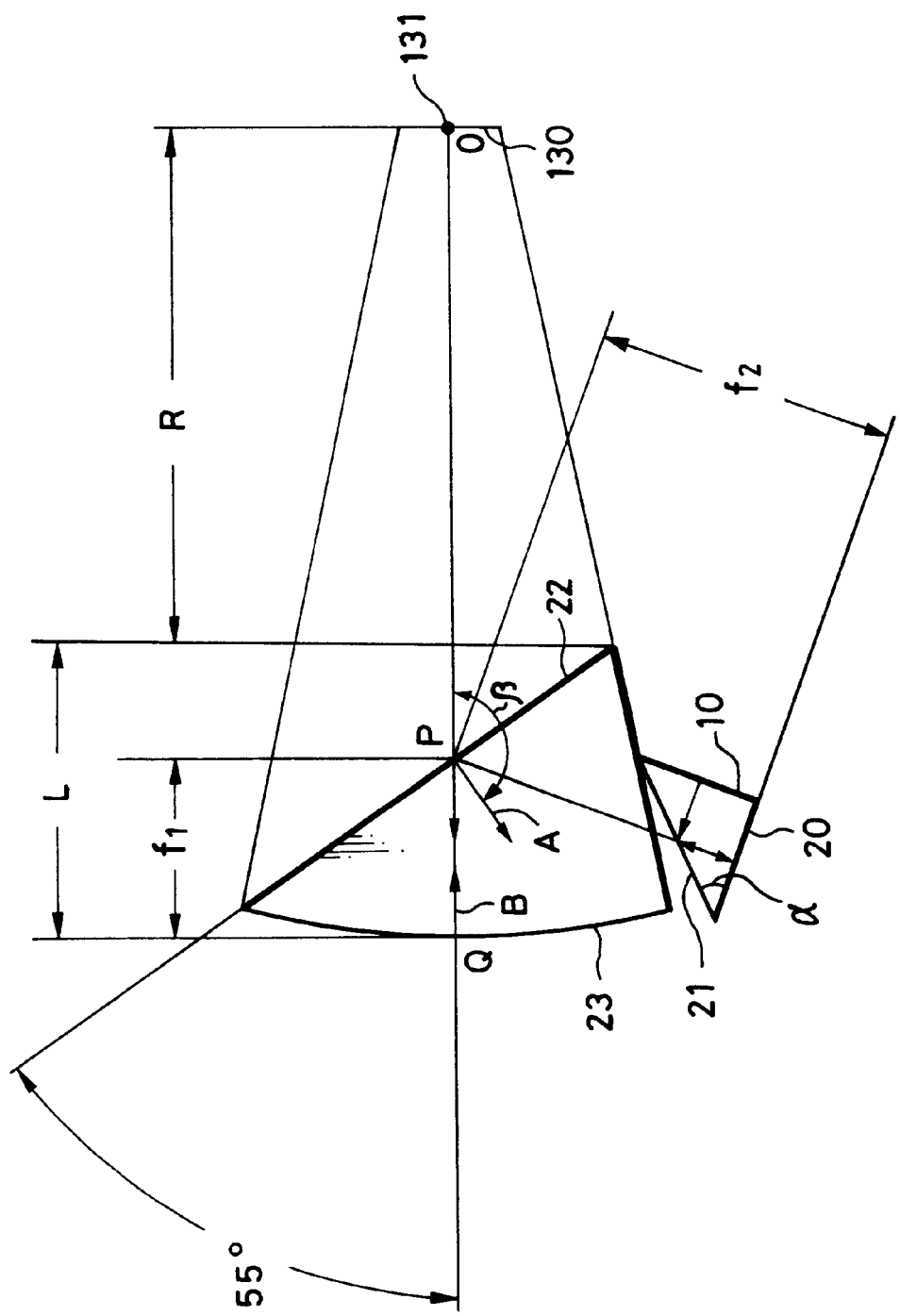
FIG. 10 is a diagram showing details of the first example of a virtual image optical system according to the present invention.

FIG. 10 is a diagram corresponding to FIG. 8, and the same components are denoted by like reference characters.

In the same way as the example of FIG. 8, the optical system of the present example includes a light source optical system and eyepiece optics. The light source optical system functions to lead light fed from the illuminating light source device 10 to the reflective spatial light modulator 20 and lead light fed from the reflective spatial light modulator 20 to the eyepiece optics. The eyepiece optics functions to lead light fed from the light source optical system to the pupil 131 in the viewing area 130.

The light source optical system includes the beam splitter 21 for deflecting light fed from the illuminating light source device 10 and leading the light into the reflective spatial light modulator 20.

The eyepiece optics includes a beam splitter 22 for deflecting light fed from the light source optical system, and the reflector 23 for leading light fed from the beam splitter 22 to the pupil 131 in the viewing area 130.

In the present example, the first half mirror 21 is the beam splitter of the light source optical system, and the angle formed by the first half mirror 21 an d the reflective spatial light modulator 20 is α.

Furthermore, the second half mirror 22 is the beam splitter of the eyepiece optics, and the concave reflector 23 is the reflector.

An angle formed by a plane normal vector A formed with respect to the second half mirror 22 and a plane normal vector B formed with respect to the concave reflector 23 is β.

In the present example, α is 45 degrees and β is 145 degrees.

Furthermore, an angle formed by the vector B and the second half mirror 22 is 55 degrees.

The angle β formed by the two vectors A and B in the present example is larger than the angle β formed by the two vectors A and B in the conventional example shown in FIGS. 7 and 8.

In the same way, a distance between a point Q on the concave reflector 23 and a point P on the second half mirror 22 is denoted by f1. A distance between the reflective spatial light modulator 20 and the point on the second half mirror 22 is denoted by f2.

A focal length f of the concave reflector 23 is equal to the sum of these two distances.

$$f = f1 + f2$$

When the value of the focal length f of the concave reflector 23 in the present example is compared with the value of the focal length f' of the concave reflector 23 in the conventional example of FIG. 8, the value of the focal length f of the concave reflector 23 in the present example is smaller.

$$f < f' \tag{4}$$

In the virtual image optical system of the present example, therefore, the magnification of the optical system can be made larger than the conventional case.

A distance between the point Q on the concave reflector 23 and a bottom end of the second half mirror 22 is denoted by L. A distance between the bottom end of the second half mirror 22 and a pupil O in the viewing area 130 is denoted by R.

The distance L represents the thickness of the optical system. The distance R represents an eye relief.

When the values of the thickness L and the eye relief R of the optical system of the present example are compared with the values of the thickness L' and the eye relief R' of the optical system of the conventional example shown in FIG. 8, the value of the thickness L of the optical system of the present example is smaller and the value of the eye relief R of the optical system of the present example is larger.

$$L < L'$$
$$R > R' \tag{5}$$

An embodiment based upon the first example of the virtual image optical system according to the present invention shown in FIG. 9 becomes as listed below.

(1) Illuminating light source device 10
   (a) Light source 11: Cold-cathode lamp
   (b) Optical film 15: Half divergence angle (HDA)≈15°
(2) Reflective spatial light modulator 20
   (a) Liquid crystal: TN type
   (b) Display section: Diagonal line length (DL)=0.55 inch
   (c) Pixel: VGA 640×480
(3) Disposition of optical system
   (a) Beam splitter of light source optical system=first half mirror 21

$$\alpha \approx 45°$$

(b) Beam splitter of eyepiece optics=second half mirror 22
      Reflector=concave reflector 23

$$\beta \approx 145°$$

By referring to FIG. 11, a second example of a virtual image optical system according to the present invention will now be described.

The virtual image optical system of the present example includes an illuminating light source device 10, an optical film 15, a polarizer 17, a reflective spatial light modulator 20, a polarization beam splitter 25, an analyzer 26, and a refractive optical element 30 with a total internal reflection surface.

The polarization beam splitter 25 may be, for example, a reflective holographic surface.

Although not illustrated, a quarter-wave plate may also be provided if necessary or desirable.

Figure 9:
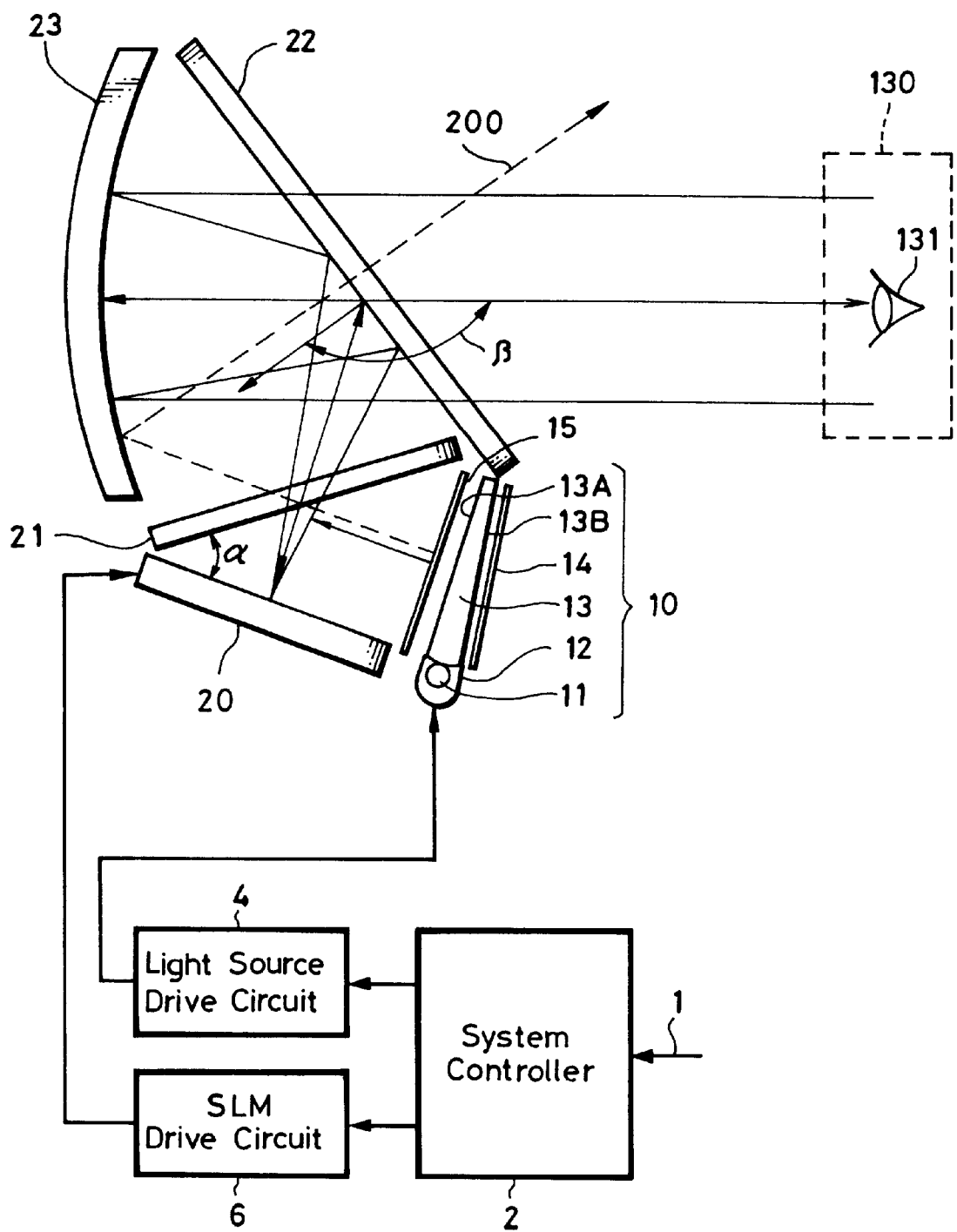
FIG. 9 is a diagram showing a first example of a virtual image optical system according to the present invention.

The illuminating light source device 10 of the present example may be the same as the illuminating light source device 10 of the first example shown in FIG. 9.

The analyzer 26 is provided to improve the contrast of the display image and reduce the stray light. The analyzer 26 is disposed so that its polarization direction will be perpendicular to the polarization direction of the polarizer 17, i.e., so that the cross-Nichols relation will be satisfied.

The eyepiece optics of the present example is formed of the refractive optical element 30 with the total internal reflection surface.

Here, the refractive optical element is an optical element having a plurality of refractive surfaces and reflective surfaces. The refractive optical element has a plurality of optical flat surfaces or curved surfaces.

The refractive optical element 30 with the total internal reflection surface has a structure filled with a medium having a refractive index larger than unity, and includes a concave refractive surface 31, a flat beam splitter surface 32, and an inward concave reflective surface 33.

In order to reduce the rotationally asymmetric aberration, each of the refractive surface 31 and the reflective surface 33 has a rotationally asymmetric or free surface.

"Free curved surface" means a rotationally asymmetric or free curved surface.

The reflective surface 33 may be formed of a reflective holographic surface.

The virtual image optical system of the present example further includes a control circuit. The control circuit includes a system controller 2, an illuminating light source device drive circuit 4, and a reflective spatial light modulator drive circuit 6.

Light fed from the illuminating light source device 10 is passed through the optical film 15 and the polarizer 17, and reflected by the polarization beam splitter 25, and arrives at the reflective spatial light modulator 20.

Light fed from the reflective spatial light modulator 20 is passed through the polarization beam splitter 25 and the analyzer 26, and arrives at the refractive optical element 30 with the total internal reflection surface.

Light passed through the refractive surface 31 of the refractive optical element 30 with the total internal reflection surface is reflected by the beam splitter surface 32 under the total reflection condition, and arrives at the reflective surface 33.

Light reflected by the reflective surface 33 is passed through the beam splitter surface 32, and arrives at a pupil 131 in a viewing area 130.

Stray light in the case of the present example will now be described.

A part of light fed from the illuminating light source device 10 is passed through the polarization beam splitter 25 and the analyzer 26, and reflected by the reflective surface 33 of the refractive optical element 30 with the total internal reflection surface.

Stray light 200 reflected by the reflective surface 33 is passed through the beam splitter surface 32, and thereby deflected in such a direction as to leave the viewing area 130.

Therefore, the stray light 200 does not arrive at the pupil 131 in the viewing area 130.

In the present example, the polarization beam splitter 25 is the beam splitter of the light source optical system, and the angle formed by the polarization beam splitter 25 and the reflective spatial light modulator 20 is $\alpha$.

The beam splitter surface 32 of the refractive optical element 30 with the total internal reflection surface is the beam splitter of the eyepiece optics, and the the reflective surface 33 is the reflector.

Therefore, an angle formed by a plane normal vector A formed with respect to the beam splitter surface 32 of the refractive optical element 30 with the total internal reflection surface and a plane normal vector B formed with respect to the reflective surface 33 is β.

Figure 12:
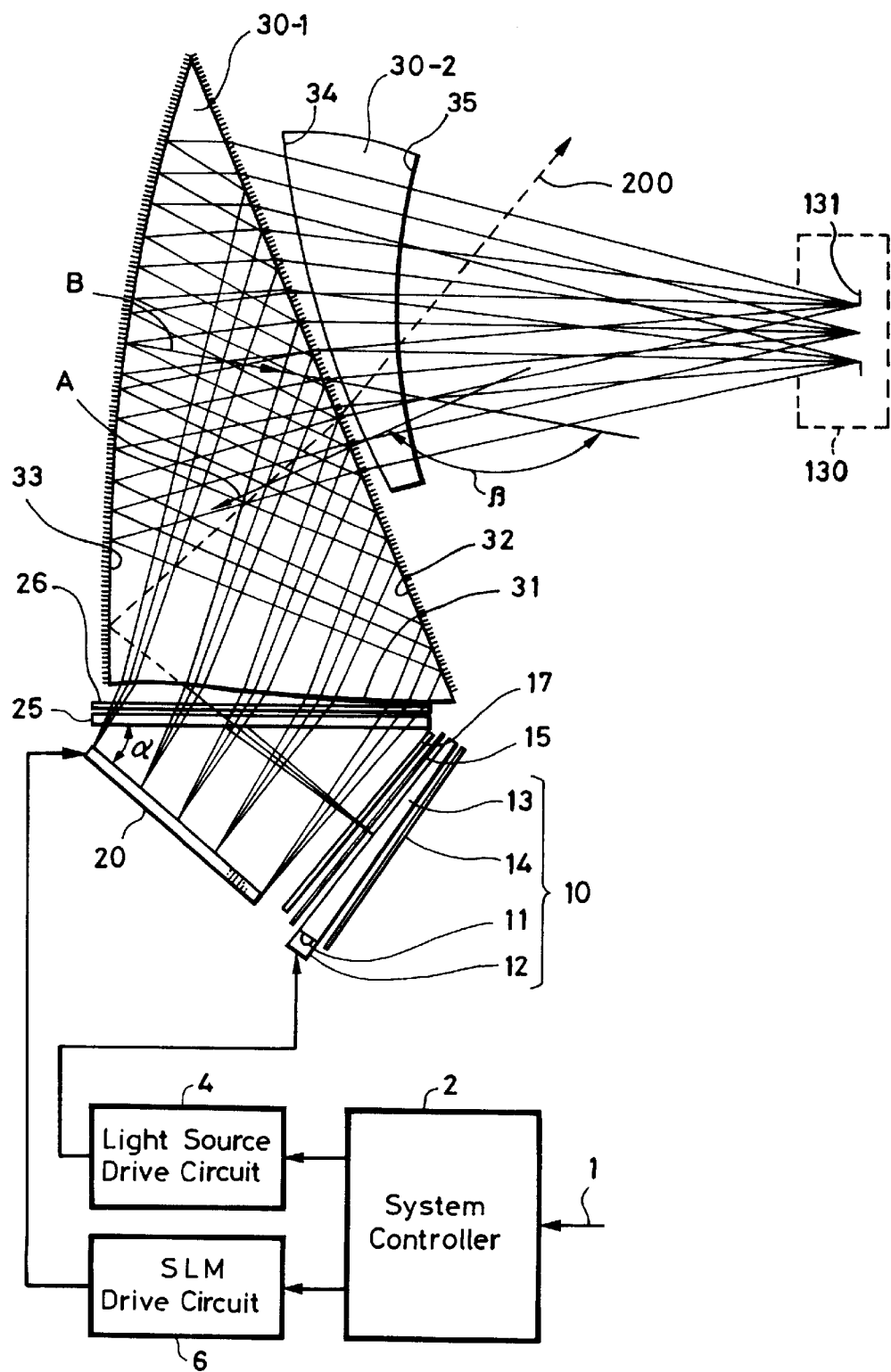
FIG. 12 is a diagram showing a third example of a virtual image optical system according to the present invention.

By referring to FIG. 12, a third example of a virtual image optical system according to the present invention will now be described.

The virtual image optical system of the present example includes an illuminating light source device 10, an optical film 15, a polarizer 17, a reflective spatial light modulator 20, a polarization beam splitter 25, an analyzer 26, and a refractive optical element 30-1 with a total internal reflection surface and a refractive optical element 30-2.

Figure 11:
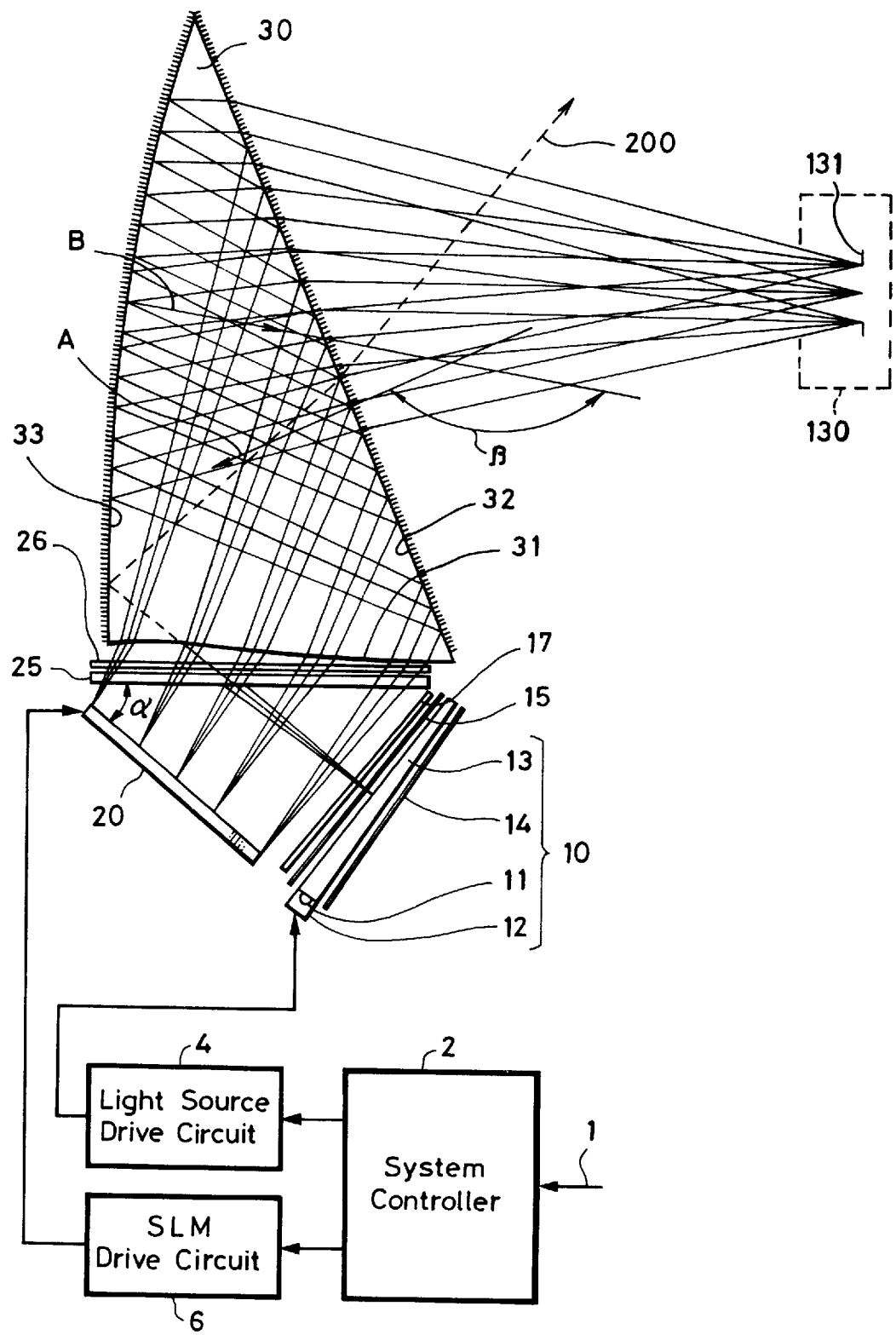
FIG. 11 is a diagram showing a second example of a virtual image optical system according to the present invention.

When the virtual image optical system of the present example is compared with the virtual image optical system of the second example shown in FIG. 11, there is a difference in that the refractive optical element 30-2 is added, and the remaining configuration may be the same as that of the second example.

Here, therefore, description of the configuration other than the refractive optical element 30-2 will now be omitted.

The eyepiece optics of the present example is formed of the refractive optical element 30-1 with the total internal reflection surface and the refractive optical element 30-2.

The refractive optical element 30-2 has first and second refractive surfaces 34 and 35. Each of the first and second refractive surfaces 34 and 35 may be formed so as to be a rotationally asymmetric or free surface.

Stray light in the case of the present example will now be described.

A part of light fed from the illuminating light source device 10 is passed through the polarization beam splitter 25 and the analyzer 26, and reflected by the reflective surface 33 of the refractive optical element 30-1 with the total internal reflection surface.

Stray light 200 reflected by the reflective surface 33 is passed through the beam splitter surface 32 and the refractive optical element 30-2, and thereby deflected in such a direction as to leave the viewing area 130.

Therefore, the stray light 200 does not arrive at the pupil 131 in the viewing area 130.

In the present example, the polarization beam splitter 25 is the beam splitter of the light source optical system, and the angle formed by the polarization beam splitter 25 and the reflective spatial light modulator 20 is α, in the same way as the second example.

The beam splitter surface 32 of the refractive optical element 30-1 with the total internal reflection surface is the beam splitter of the eyepiece optics, and the the reflective surface 33 is the reflector.

An angle formed by a plane normal vector A formed with respect to the beam splitter surface 32 of the refractive optical element 30-1 with the total internal reflection surface and a plane normal vector B formed with respect to the reflective surface 33 is β.

An embodiment based upon the second and third examples of the virtual image optical system according to the present invention shown in FIGS. 11 and 12 becomes as listed below.

(1) Illuminating light source device 10
   (a) Light source 11: Light emission diode (LED)
   (b) Optical film 15: Half divergence angle (HDA)≈15°
(2) Reflective spatial light modulator 20
   (a) Liquid crystal: FLC type
   (b) Display section: Diagonal line length (DL)=0.55 inch
   (c) Pixel: VGA 640×480

(3) Disposition of optical system
   (a) Beam splitter of light source optical system= polarization beam splitter 25

$$\alpha \approx 45°$$

(b) Beam splitter of eyepiece optics=beam splitter surface 32 of the refractive optical element 30 or 30-1 with the total internal reflection surface
   Reflector=reflective surface 33 of the refractive optical element 30 or 30-1 with the total internal reflection surface $$\beta \approx 145°$$

Figure 13:
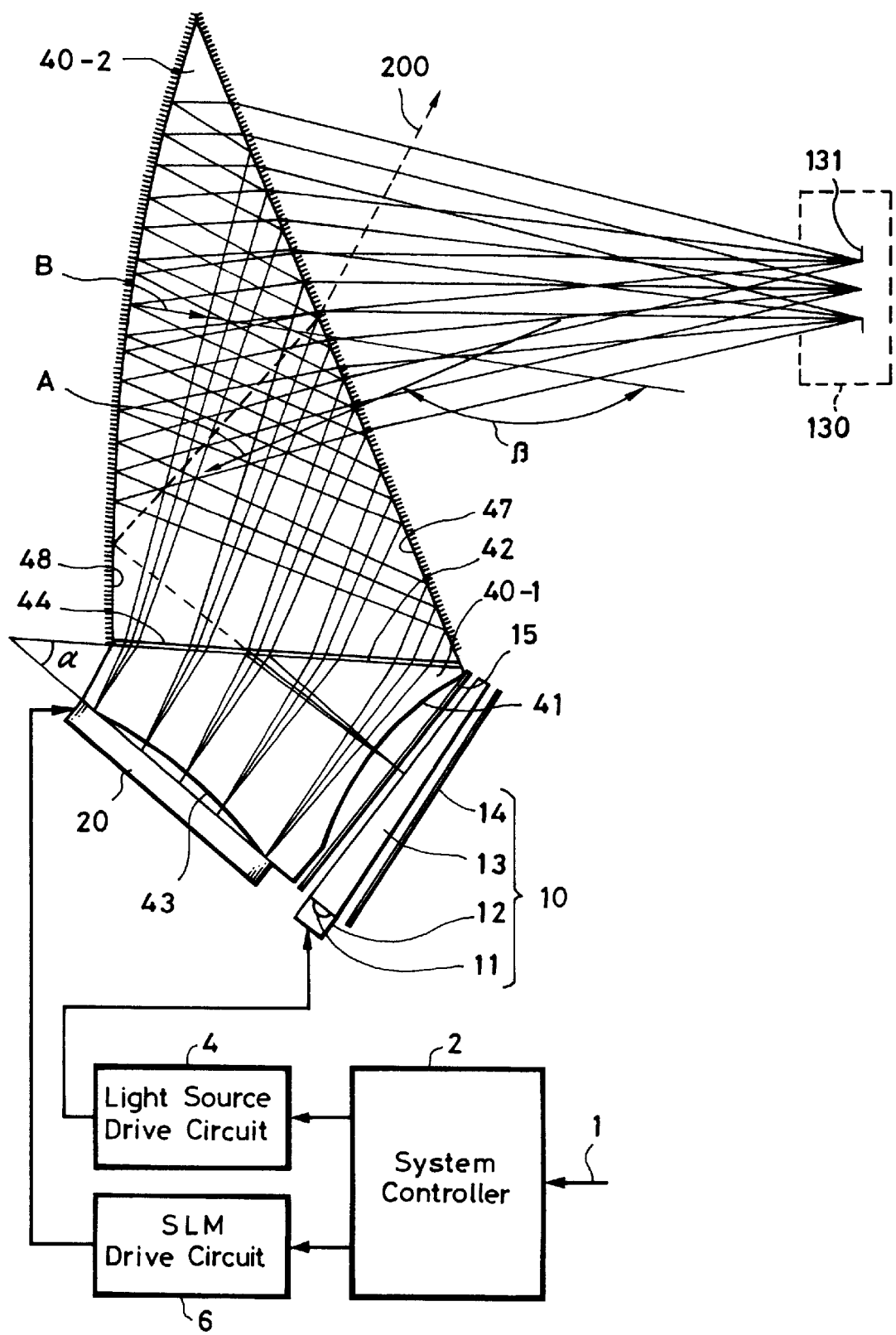
FIG. 13 is a diagram showing a fourth example of a virtual image optical system according to the present invention.

By referring to FIG. 13, a fourth example of a virtual image optical system according to the present invention will now be described.

The virtual image optical system of the present example includes an illuminating light source device 10, an optical film 15, a reflective spatial light modulator 20, a refractive optical element 40-1, and a refractive optical element 40-2 with a total internal reflection surface.

According to the present example, the light source optical system is formed of the refractive optical element 40-1, and the eyepiece optics are formed of the refractive optical element 40-2 with the total internal reflection surface.

The refractive optical element 40-1 includes first and second concave refractive surfaces 41 and 43, and a half mirror 42.

The half mirror 42 may also be a reflective holographic surface.

The refractive optical element 40-2 with the total internal reflection surface includes a refractive surface 44, a flat beam splitter surface 47, and an inward concave reflective surface 48.

The refractive optical element 40-1 and the refractive optical element 40-2 with the total internal reflection surface may be formed as separate refractive optical element, or may be optically closely glued via the half mirror 42 and the refractive surface 44.

In the case where the two refractive optical elements 40-1 and 40-2 are optically closely glued, the half mirror 42 and the refractive surface 44 are surfaces formed inside the refractive optical elements 40-1 and 40-2.

The light source optical system and the eyepiece optics respectively formed of the refractive optical element 40-1 and the refractive optical element 40-2 with the total internal reflection surface are eccentric optical systems.

In order to reduce the rotationally asymmetric aberration, therefore, each of the first and second refractive surfaces 41 and 43 of the refractive optical element 40-1 and the reflective surface 48 of the refractive optical element 40-2 with the total internal reflection surface is formed so as to be a rotationally asymmetric free surface.

The reflective surface 48 of the refractive optical element 40-2 with the total internal reflection surface may be, for example, a reflective holographic surface.

Instead of the half mirror 42, a polarization beam splitter may be provided, and furthermore a quarter-wave plate may be provided.

Furthermore, although not illustrated, a polarizer and an analyzer may be provided if necessary or desirable.

Light fed from the illuminating light source device 10 is passed through the optical film 15, passed through the first refractive surface 41 of the refractive optical element 40-1, reflected by the half mirror 42, and passed through the second refractive surface 43. The light thus arrives at the reflective spatial light modulator 20.

Light fed from the reflective spatial light modulator 20 is passed through the second refractive surface 43 and the half mirror 42 of the refractive optical element 40-1, and arrives at the refractive optical element 40-2 with the total internal reflection surface.

The light which has arrived at the refractive optical element 40-2 with the total internal reflection surface is passed through the refractive surface 44, and reflected by the beam splitter surface 47 of the refractive optical element 40-2 under the total reflection condition.

The light reflected by the beam splitter surface 47 is reflected by the reflective surface 48, and passed through the beam splitter surface 47, and it arrives at a pupil 131 in a viewing area 130.

Stray light in the case of the present example will now be described.

A part of light fed from the illuminating light source device 10 is passed through the half mirror 42 and the refractive surface 44, and reflected by the reflective surface 48 of the refractive optical element 40-2 with the total internal reflection surface.

Stray light 200 reflected by the reflective surface 48 is transmitted by way of the beam splitter surface 47, and thereby deflected in such a direction as to leave the viewing area 130.

Therefore, the stray light 200 does not arrive at the pupil 131 in the viewing area 130.

In the present example, the half mirror 42 of the refractive optical element 40-1 is the beam splitter of the light source optical system. Therefore, the angle formed by the half mirror 42 and the reflective spatial light modulator 20 is α.

Furthermore, the beam splitter surface 47 of the refractive optical element 40-2 with the total internal reflection surface is the beam splitter of the eyepiece optics, and the the reflective surface 48 is the reflector.

An angle formed by a plane normal vector A formed with respect to the beam splitter surface 47 of the refractive optical element 40-2 with the total internal reflection surface and a plane normal vector B formed with respect to the reflective surface 48 is β.

Figure 14:
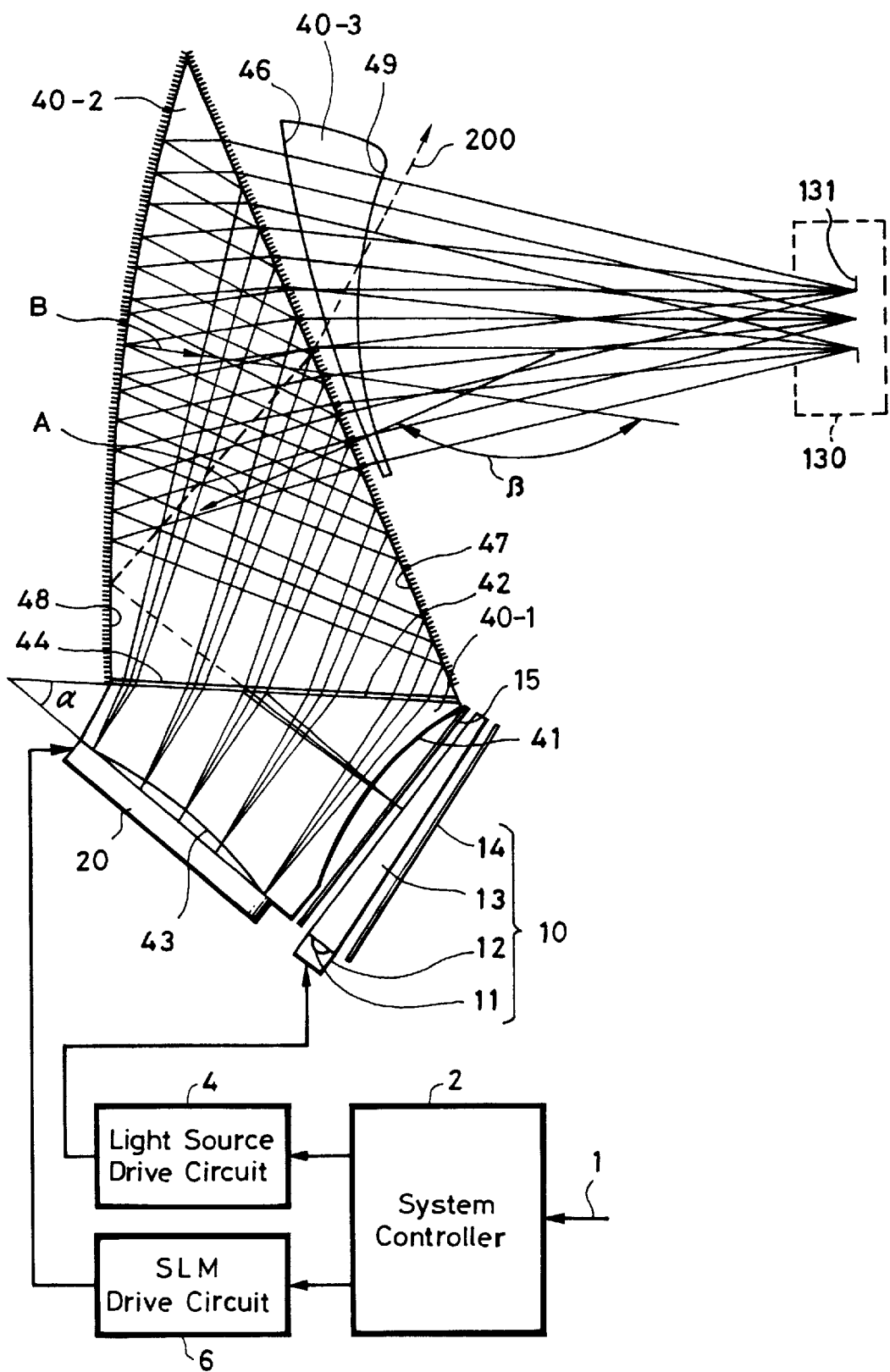
FIG. 14 is a diagram showing a fifth example of a virtual image optical system according to the present invention.

By referring to FIG. 14, a fifth example of a virtual image optical system according to the present invention will now be described.

The virtual image optical system of the present example includes an illuminating light source device 10, an optical film 15, a reflective spatial light modulator 20, a refractive optical element 40-1, a refractive optical element 40-2 with a total internal reflection surface, and a refractive optical element 40-3.

When the virtual image optical system of the present example is compared with the virtual image optical system of the four example, there is a difference in that a second refractive optical element 40-3 has been added. The remaining configuration may be the same as that of the fourth example.

Here, therefore, description of the configuration other than the refractive optical element 40-3 will be omitted.

Eyepiece optics of the present example are formed of the refractive optical element 40-2 with the total internal reflection surface and the refractive optical element 40-3.

The second refractive optical element 40-3 includes first and second refractive surfaces 46 and 49. The first and second refractive surfaces 46 and 49 may be formed so as to be a rotationally asymmetric or free surface.

Stray light in the case of the present example will now be described.

A part of light fed from the illuminating light source device 10 is passed through the half mirror 42 and the refractive surface 44, and reflected by the reflective surface 48 of the refractive optical element 40-2 with the total internal reflection surface.

Stray light 200 reflected by the reflective surface 48 is passed through the beam splitter surface 47 and the refractive optical element 40-3, and thereby deflected in such a direction as to leave the viewing area 130.

Therefore, the stray light 200 does not arrive at the pupil 131 in the viewing area 130.

In the present example, the half mirror 42 is the beam splitter of the light source optical system as the forth example. The angle formed by the half mirror 42 and the reflective spatial light modulator 20 is α.

The beam splitter surface 47 of the refractive optical element 40-2 with the total internal reflection surface is the beam splitter of the eyepiece optics, and the reflective surface 48 is the reflector.

Therefore, an angle formed by a plane normal vector A formed with respect to the beam splitter surface 47 of the refractive optical element 40-2 with the total internal reflection surface and a plane normal vector B formed with respect to the reflective surface 48 is β.

An embodiment based upon the fourth and fifth examples of the virtual image optical system according to the present invention shown in FIGS. 13 and 14 becomes as listed below.

(1) Illuminating light source device 10
   (a) Light source 11: Light emission diode (LED)
   (b) Optical film 15: Half divergence angle (HDA)≈15°
(2) Reflective spatial light modulator 20
   (a) Liquid crystal: TN type
   (b) Display section: Diagonal line length (DL)=0.55 inch
   (c) Pixel: VGA 640×480
(3) Disposition of optical system
   (a) Beam splitter of light source optical system=half mirror 42 of the refractive optical element 40-1

$$\alpha \approx 40°$$

(b) Beam splitter of eyepiece optics=beam splitter surface 47 of the refractive optical element 40-2 with the total internal reflection surface
   Reflector=reflector surface 48 of the refractive optical element 40-2 with the total internal reflection surface $$\beta \approx 140°$$

By referring to FIG. 15, a sixth example of a virtual image optical system according to the present invention will now be described.

The virtual image optical system of the present example includes an illuminating light source device 10, an optical film 15, a reflective spatial light modulator 20, and a refractive optical element 50 made of glass.

As illustrated, the glass-made refractive optical element 50 includes four refractive optical elements 50-1, 50-2, 50-3 and 50-4 made of glass.

According to the present example, the light source optical system is formed of the first glass-made refractive optical element 50-1, and the eyepiece optics are formed of the second, third and fourth glass-made refractive optical elements 50-2, 50-3 and 50-4.

The light source optical system includes a first concave refractive surface 51, a half mirror 52, and a second convex refractive surface 53.

The eyepiece optics include a third refractive surface 54, a polarization beam splitter 57, a quarter-wave plate 56, an inward concave reflective surface 58, and a fourth concave reflective surface 59.

Each of the half mirror 52 and the third refractive surface 54 may be a cylindrical surface having a central axis perpendicular to the paper.

Although the glass-made refractive optical element 50 may be formed of four separate glass-made refractive optical elements 50-1, 50-2, 50-3 and 50-4, the refractive optical element 50 may be formed as one glass-made refractive optical element by optically closely gluing the refractive optical elements 50-1, 50-2, 50-3 and 50-4.

In the case where the the refractive optical element is formed as one glass-made refractive optical element, the half mirror 52, the polarization beam splitter 57, and the quarter-wave plate 56 are surfaces which are formed inside the glass-made refractive optical element 50.

The half mirror 52 may be a reflective holographic surface.

The reflective surface 58 may be, for example, a reflective holographic surface.

Furthermore, although not illustrated, a polarizer and an analyzer may be provided if necessary of desirable.

Each of the first, second and third refractive surfaces 51, 53 and 59 of the glass-made refractive optical element 50, and the reflective surface 58 is formed of an aspheric surface in order to mainly correct the distortion and the field curvature.

"Aspheric surface" means an axial symmetric aspheric curved surface.

Light fed from the illuminating light source device 10 is passed through the optical film 15, passed through the first refractive surface 51 of the refractive optical element 50 made of glass, and reflected by the half mirror 52 having a cylindrical surface.

By providing the half mirror 52 with a cylindrical surface shape, illuminating light fed from the illuminating light source device 10 is led to the reflective spatial light modulator 20 efficiently and uniformly.

Light fed from the half mirror 52 is passed through the second refractive surface 53, and arrives at the reflective spatial light modulator 20.

Light fed from the reflective spatial light modulator 20 is passed through the second refractive surface 53, and arrives at the half mirror 52.

Light passed through the half mirror 52 is reflected by the polarization beam splitter 57, passed through the quarter-wave plate 56, and arrives at the reflective surface 58.

Light reflected by the reflective surface 58 is passed through the quarter-wave plate 56 again.

Linearly polarized light incident upon the reflective surface 58 is passed through the quarter-wave plate 56, and thereby becomes circularly polarized light.

Circularly polarized light reflected by the reflective surface 58 is passed through the quarter-wave plate 56, and thereby becomes linearly polarized light.

The linearly polarized light on the backward path has a polarization state perpendicular to the linearly polarized light on the forward path.

The linearly polarized light fed from the quarter-wave plate 56 is passed through the polarization beam splitter 57 and the third refractive surface 59, and arrives at a pupil 131 in a viewing area 130.

Stray light in the case of the present example will now be described.

A part of light fed from the illuminating light source device 10 is passed through the half mirror 52, and reflected by the reflective surface 58.

Stray light 200 reflected by the reflective surface 58 is passed through the third refractive surface 59, and thereby deflected in such a direction as to leave the viewing area 130.

Therefore, the stray light 200 does not arrive at the pupil 131 in the viewing area 130.

In the present example, the half mirror 52 of the first glass-made refractive optical element 50-1 is the beam splitter of the light source optical system. Therefore, the angle formed by the half mirror 52 and the reflective spatial light modulator 20 is $\alpha$.

Furthermore, the beam splitter surface 57 of the second glass-made refractive optical element 50-2 is the beam splitter of the eyepiece optics, and the the reflective surface 58 of the fourth glass-made refractive optical element 50-4 is the reflector.

Therefore, an angle formed by a plane normal vector A formed with respect to the beam splitter surface 57 and a plane normal vector B formed with respect to the reflective surface 58 is $\beta$.

An embodiment based upon the sixth example of the virtual image optical system according to the present invention shown in FIG. 15 becomes as listed below.

(1) Illuminating light source device 10
   (a) Light source 11: Light emission diode (LED)
   (b) Optical film 15: Half divergence angle (HDA)$\approx 20°$
(2) Reflective spatial light modulator 20
   (a) Liquid crystal: TN type
   (b) Display section: Diagonal line length (DL)=0.45 inch
   (c) Pixel: SVGA 800×600
(3) Disposition of optical system
   (a) Beam splitter of light source optical system=half mirror 52 of the glass-made refractive optical element 50

$$\alpha \approx 45°$$

(b) Beam splitter of eyepiece optics=beam splitter surface 57 of the glass-made refractive optical element 50
   Reflector=reflective surface 58 of the glass-made refractive optical element 50

$$\beta \approx 145°$$

Figure 16:
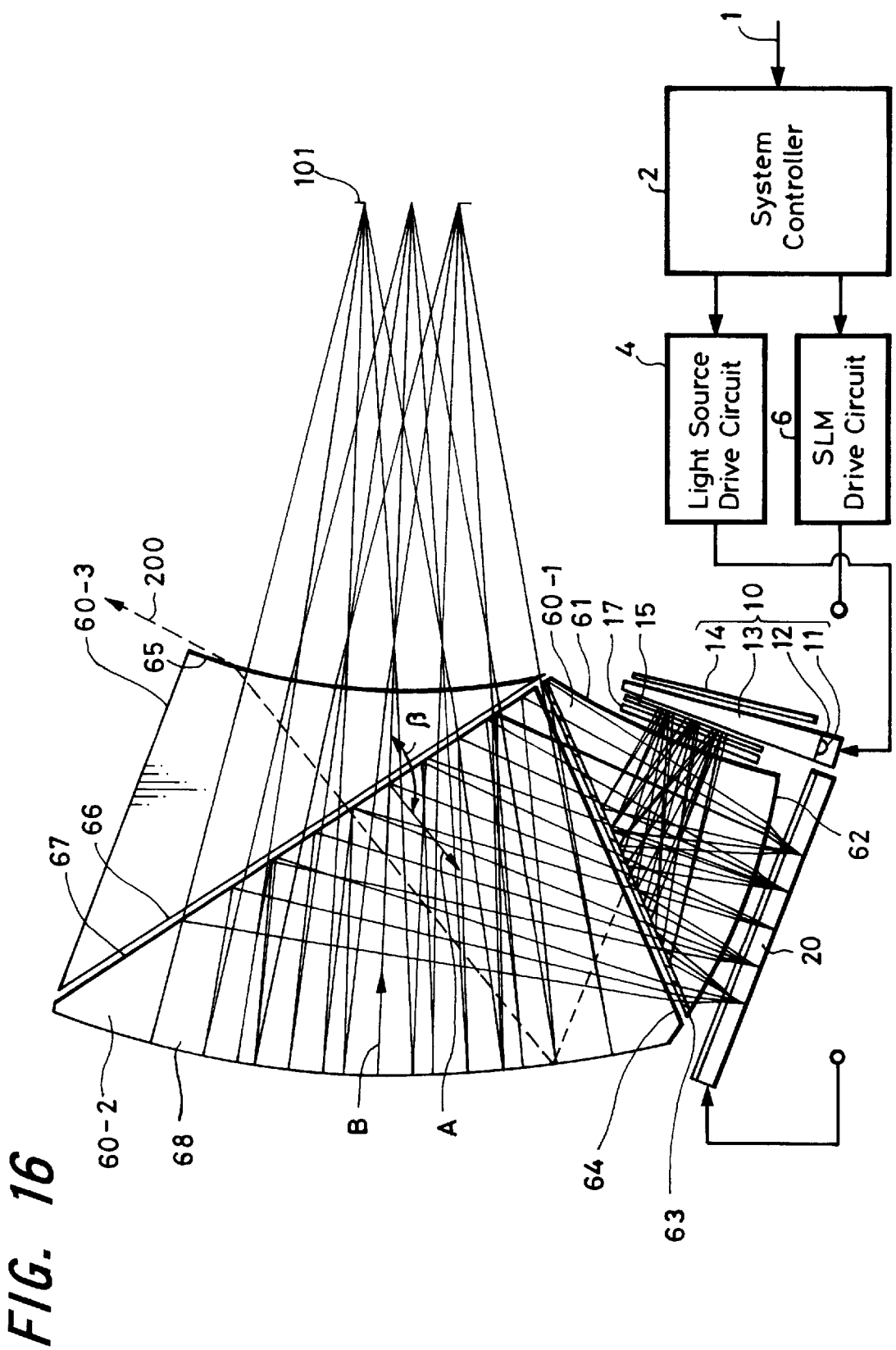
FIG. 16 is a diagram showing a seventh example of a virtual image optical system according to the present invention.

By referring to FIG. 16, a seventh example of a virtual image optical system according to the present invention will now be described.

The virtual image optical system of the present example includes an illuminating light source device 10, an optical film 15, a polarizer 17, a reflective spatial light modulator 20, a refractive optical element 60-1 made of glass, and first and second optical elements 60-2 and 60-3 made of plastics.

According to the present example, the light source optical system is formed of the glass-made refractive optical element 60-1, and the eyepiece optics are formed of the first and second plastic-made refractive optical elements 60-2 and 60-3.

In the present example, the first and second plastic-made refractive optical elements 60-2 and 60-3 of the eyepiece optics may be optically closely glued to form a refractive optical element as one body.

Furthermore, the glass-made refractive optical element 60-1, and the first and second plastic-made refractive optical elements 60-2 and 60-3 may be optically closely glued to form a refractive optical element as one body.

The glass-made refractive optical element 60-1 includes a first concave refractive surface 61, a polarization beam splitter 63, and a second convex refractive surface 62.

The glass-made first refractive optical element 60-2 includes an analyzer 64, a half mirror 67, and an inward concave reflective surface 68.

The second plastic-made refractive optical element 60-3 includes a first flat refractive surface 66, and a second concave refractive surface 65.

Each of the first and second refractive surfaces 61 and 62 of the glass-made refractive optical element 60-1, the reflective surface 68 of the first plastic-made refractive optical element 60-2, and the reflective surface 65 of the second plastic-made refractive optical element 60-3 is formed so as to be an aspheric surface.

The polarization beam splitter 63 of the glass-made refractive optical element 60-1 may be a reflective holographic surface.

The reflective surface 68 of the first plastic-made refractive optical element 60-2 may be, for example, a reflective holographic surface.

A polarization beam splitter may be provided instead of the half mirror 67. Furthermore, a quarter-wave plate may be provided.

The analyzer 64 is provided to improve the contrast of the display image and reduce the stray light. The analyzer 64 is disposed so that its polarization direction will be perpendicular to the polarization direction of the polarizer 17, i.e., so that the cross-Nichols relation will be satisfied.

Light fed from the illuminating light source device 10 is passed through the optical film 15 and the polarizer 17, passed through the first refractive surface 61 of the glass-made refractive optical element 60-1, reflected by the polarization beam splitter 63, passed through the second refractive surface 62, and arrives at the reflective spatial light modulator 20.

Light fed from the reflective spatial light modulator 20 is passed through the second refractive surface 62 and the polarization beam splitter 63 of the glass-made refractive optical element 60-1, and arrives at the first plastic-made refractive optical element 60-2.

The light which has arrived at the first plastic-made refractive optical element 60-2 is passed through the analyzer 64, reflected by the half mirror 67 and the reflective surface 68, transmitted by the half mirror 67, and arrives at the second plastic-made refractive optical element 60-3.

The light which has arrived at the second plastic-made refractive optical element 60-3 is passed through the first and second reflective surfaces 66 and 65, and arrives at a pupil 131 in a viewing area 130.

Stray light in the case of the present example will now be described.

A part of light fed from the illuminating light source device 10 is passed through the polarization beam splitter 63 of the glass-made refractive optical element 60-1, and reflected by the plastic-made reflective surface 68 of the first refractive optical element 60-2.

Stray light 200 reflected by the reflective surface 68 is passed through the refractive surface 65 of the second plastic-made refractive optical element 60-3, and thereby deflected in such a direction as to leave the viewing area 130.

Therefore, the stray light 200 does not arrive at the pupil 131 in the viewing area 130.

In the present example, the polarization beam splitter 63 of the glass-made refractive optical element 60-1 is the beam splitter of the light source optical system. Therefore, the angle formed by the polarization beam splitter 63 and the reflective spatial light modulator 20 is $\alpha$.

Furthermore, the half mirror 67 of the first plastic-made refractive optical element 60-2 is the beam splitter of the eyepiece optics, and the the reflective surface 68 is the reflector.

Therefore, an angle formed by a plane normal vector A formed with respect to the half mirror 67 of the first plastic-made refractive optical element 60-2 and a plane normal vector B formed with respect to the reflective surface 68 is $\beta$.

An embodiment based upon the seventh example of the virtual image optical system according to the present invention shown in FIG. 16 becomes as listed below.

(1) Illuminating light source device 10
  (a) Light source 11: Light emission diode (LED)
  (b) Optical film 15: Half divergence angle (HDA)$\approx$20°
(2) Reflective spatial light modulator 20
  (a) Liquid crystal: FLC type
  (b) Display section: Diagonal line length (DL)=0.45 inch
  (c) Pixel: SVGA 800×600
(3) Disposition of optical system
  (a) Beam splitter of light source optical system= polarization beam splitter 63 of the glass-made refractive optical element 60-1

$$\alpha \approx 45°$$

(b) Beam splitter of eyepiece optics=half mirror 67 of the plastic-made refractive optical element 60-2
  Reflector=reflective surface 68 of the plastic-made refractive optical element 60-2

$$\beta \approx 145°$$

By referring to FIG. 17, an eighth example of a virtual image optical system according to the present invention will now be described.

The virtual image optical system of the present example includes an illuminating light source device 10, an optical film 15, a polarizer 17, a reflective spatial light modulator 20, a half mirror 21, an analyzer 26, and a refractive optical element 70 made of plastic.

According to the present example, the eyepiece optics are formed of the plastic-made refractive optical element 70.

The plastic-made refractive optical element 70 includes a first spheric refractive surface 71, a half mirror 72, an inward concave reflective surface 73, and a second aspheric refractive surface 74.

The half mirror 72 is a surface which is formed inside the plastic-made refractive optical element 70.

The half mirror 72 may be a reflective holographic surface.

The reflective surface 73 may be a reflective holographic surface, and is formed so as to be an aspheric surface.

A polarization beam splitter may be provided instead of the half mirror 72. Furthermore, a quarter-wave plate may be provided.

Light fed from the illuminating light source device 10 is passed through the optical film 15 and the polarizer 17, reflected by the half mirror 21, and arrives at the reflective spatial light modulator 20.

Light fed from the reflective spatial light modulator 20 is passed through the half mirror 21 and the analyzer 26, and arrives at the plastic-made refractive optical element 70.

The light which has arrived at the plastic-made refractive optical element 70 is passed through the first refractive surface 71, reflected by the half mirror 72 and the reflective surface 73, passed through the half mirror 72 and the second refractive surface 74, and arrives at a pupil 131 in a viewing area 130.

Stray light in the case of the present example will now be described.

A part of light fed from the illuminating light source device 10 is passed through the half mirror 21 and the analyzer 26, and reflected by the reflective surface 73 of the plastic-made refractive optical element 70.

In the present example, however, the stray light reflected by the reflective surface 73 of the plastic-made refractive optical element 70 does not arrive at the pupil 131 in the viewing area 130.

By referring to FIG. 18, a ninth example of a virtual image optical system according to the present invention will now be described.

The virtual image optical system of the present example includes an illuminating light source device 10, an optical film 15, a polarizer 17, a reflective spatial light modulator 20, a half mirror 21, an analyzer 26, and a refractive optical element 80 made of plastic.

According to the present example, the eyepiece optics are formed of the refractive optical element 80 made of plastic.

Figure 17:
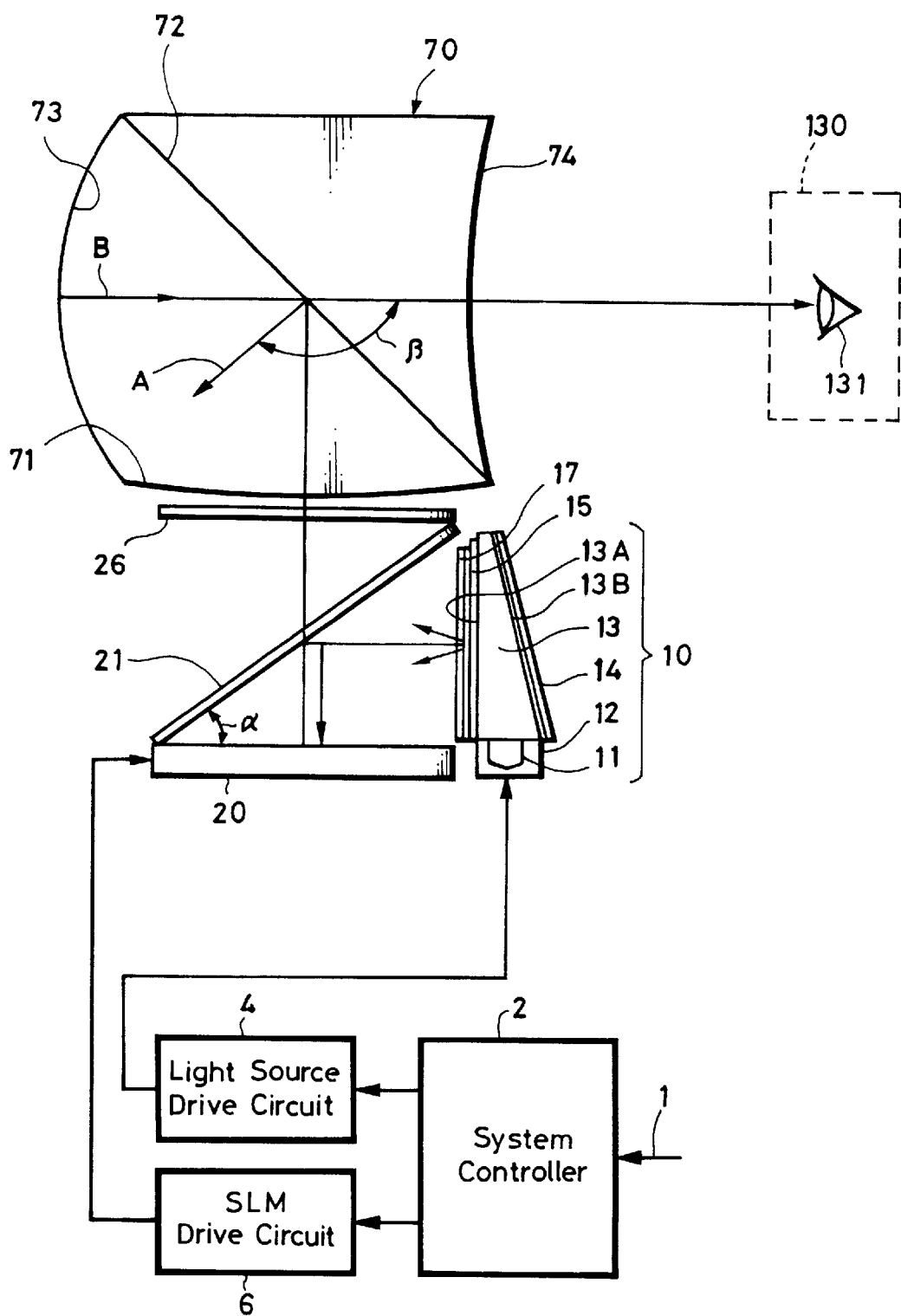
FIG. 17 is a diagram showing an eighth example of a virtual image optical system according to the present invention.

When the virtual image optical system of the present example is compared with the eighth example of FIG. 17, there is a difference in position of the reflective surface of the plastic refractive optical element. Remaining configuration may be the same.

The plastic refractive optical element 80 includes a first spheric refractive surface 81, a half mirror 82, an inward concave reflective surface 83, and a second aspheric refractive surface 84.

The half mirror 82 is a surface formed inside the plastic refractive optical element 80.

The half mirror 82 may be a reflective holographic surface.

The reflective surface 83 may be a reflective holographic surface, and is formed so as to be an aspheric surface.

A polarization beam splitter may be provided instead of the half mirror 72. Furthermore, a quarter-wave plate may be provided.

Light fed from the illuminating light source device 10 is passed through the optical film 15 and the polarizer 17, reflected by the half mirror 21, and arrives at the reflective spatial light modulator 20.

Light fed from the reflective spatial light modulator 20 is passed through the half mirror 21 and the analyzer 26, and arrives at the refractive optical element 80 made of plastic.

The light which has arrived at the plastic refractive optical element 80 is passed through the first refractive surface 81, passed through the half mirror 82, reflected by the reflective surface 83 and the half mirror 82, passed through the second refractive surface 84, and arrives at a pupil 131 in a viewing area 130.

Stray light in the case of the present example will now be described.

A part of light fed from the illuminating light source device 10 is passed through the half mirror 21 and the analyzer 26, and arrives at the plastic refractive optical element 80.

In the present example, however, the stray light which has arrived at the plastic refractive optical element 80 does not arrive at the pupil 131 in the viewing area 130.

Figure 18:
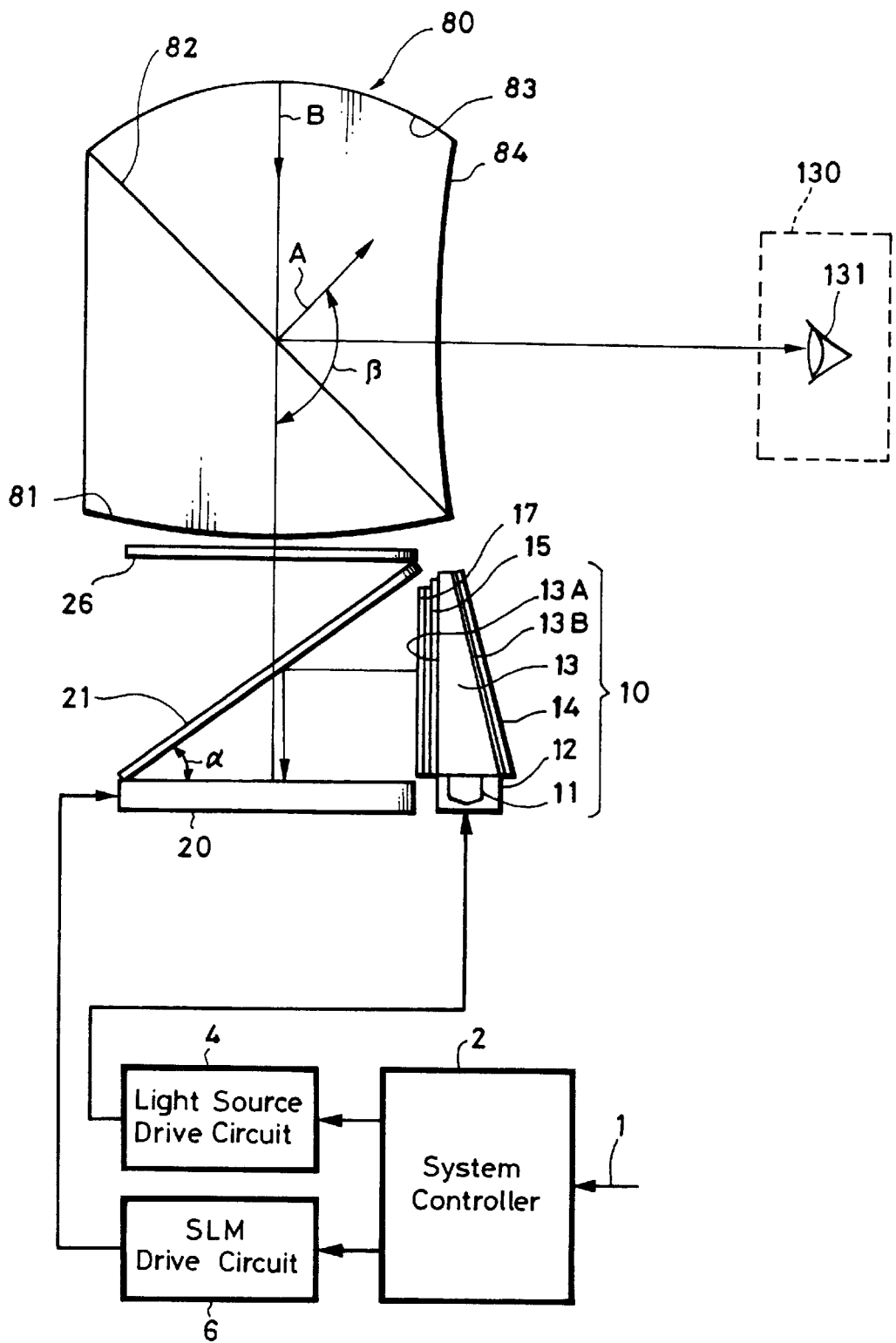
FIG. 18 is a diagram showing a ninth example of a virtual image optical system according to the present invention.

In the examples shown in FIGS. 17 and 18, the half mirror 21 is the beam splitter of the light source optical system. Therefore, the angle formed by the half mirror 21 and the reflective spatial light modulator 20 is α.

Furthermore, the half mirror 72 or 82 of the plastic refractive optical element 70 or 80 is the beam splitter of the eyepiece optics, and the the reflective surface 73 or 83 is the reflector.

Therefore, an angle formed by a plane normal vector A formed with respect to the half mirror 72 or 82 and a plane normal vector B formed with respect to the reflective surface 73 or 83 of the plastic refractive optical element 70 or 80 is β.

An embodiment based upon the eighth and ninth example of the virtual image optical system according to the present invention shown in FIGS. 17 and 18 becomes as listed below.

(1) Illuminating light source device 10
   (a) Light source 11: Light emission diode (LED)
   (b) Optical film 15: Half divergence angle (HDA)≈20°
(2) Reflective spatial light modulator 20
   (a) Liquid crystal: FLC type
   (b) Display section: Diagonal line length (DL)=0.55 inch
   (c) Pixel: VGA 640×800
(3) Disposition of optical system
   (a) Beam splitter of light source optical system=half mirror 21

$$\alpha \approx 45°$$

(b) Beam splitter of eyepiece optics=half mirror 72 or 82 of the plastic refractive optical element 70 or 80
   Reflector=reflective surface 73 or 83 of the plastic refractive optical element 70 or 80

$$\beta \approx 135°$$

Figure 19:
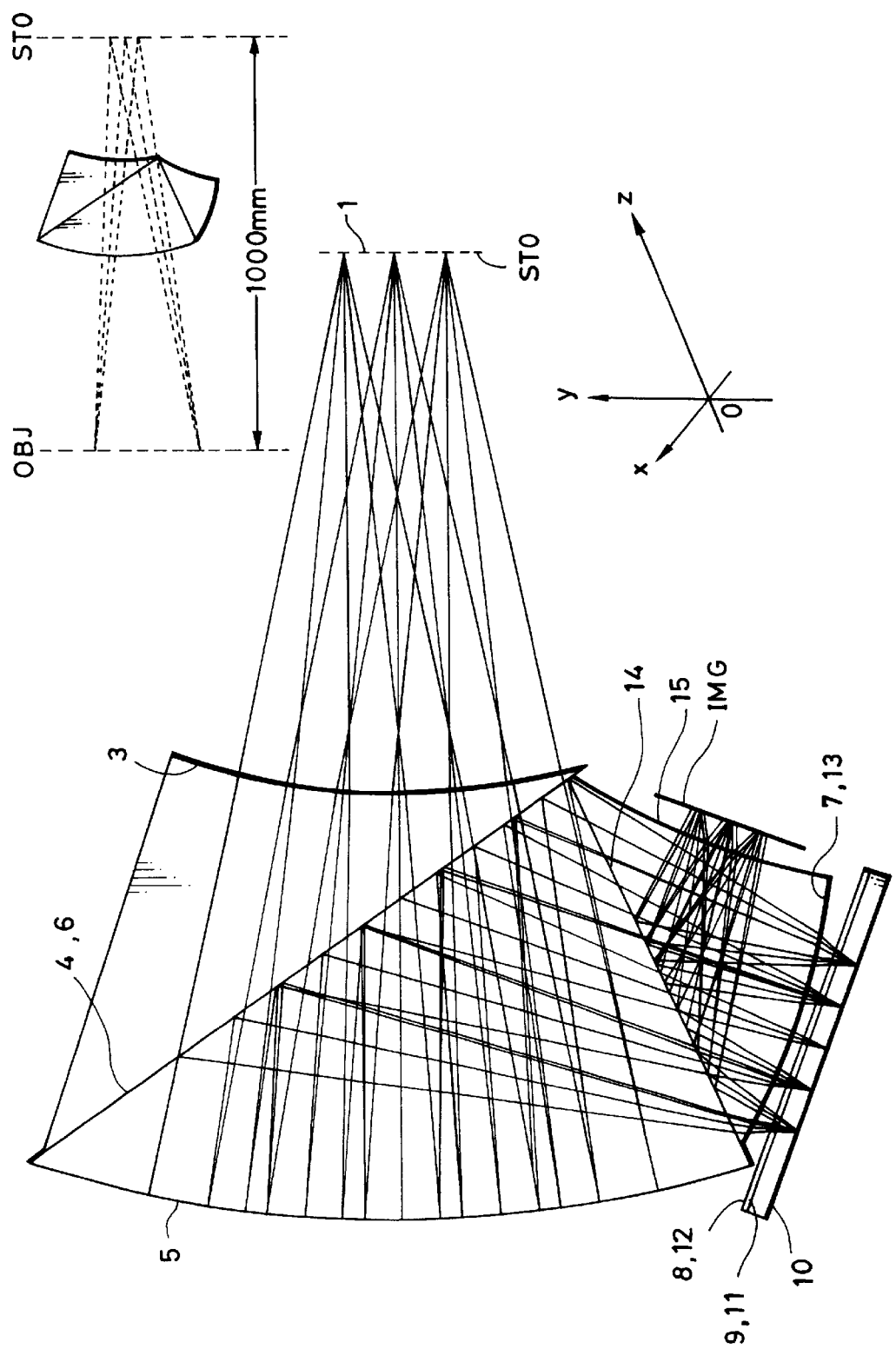
FIG. 19 is a ray diagram showing a tenth example of a virtual image optical system according to the present invention.
Figure 24A:
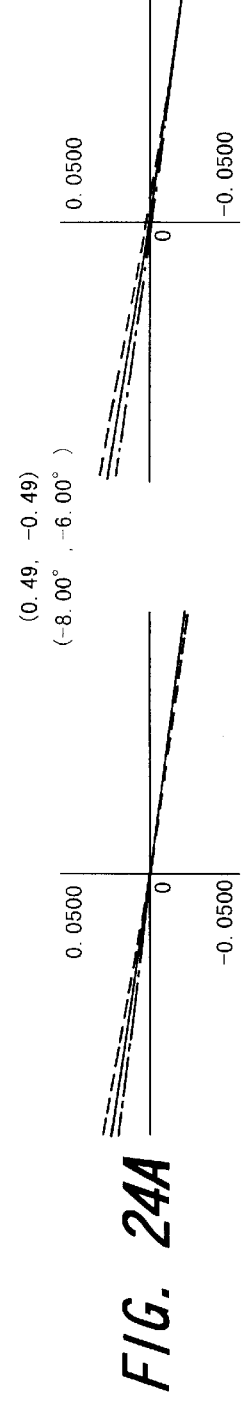
FIG. 24 is a diagram showing ray aberration of the tenth example of a virtual image optical system according to the present invention.
Figure 24B:
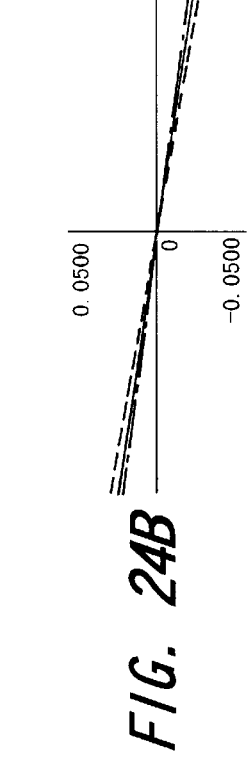
Figure 24C:
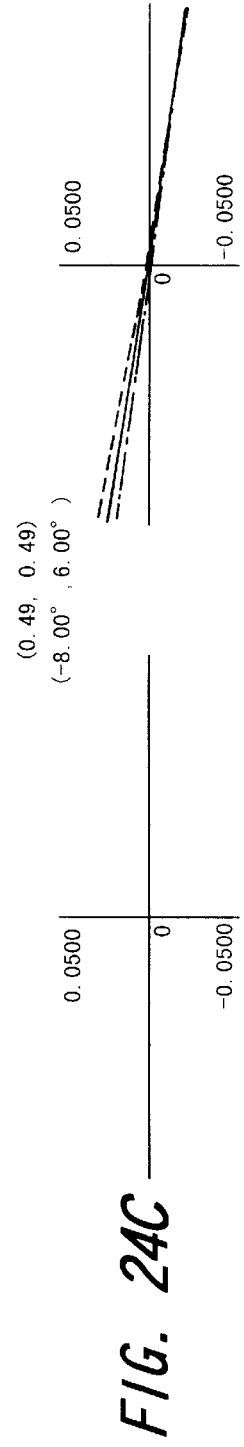

FIG. 19 shows a ray diagram of a tenth example of a virtual image optical system according to the present invention.

Figure 15:
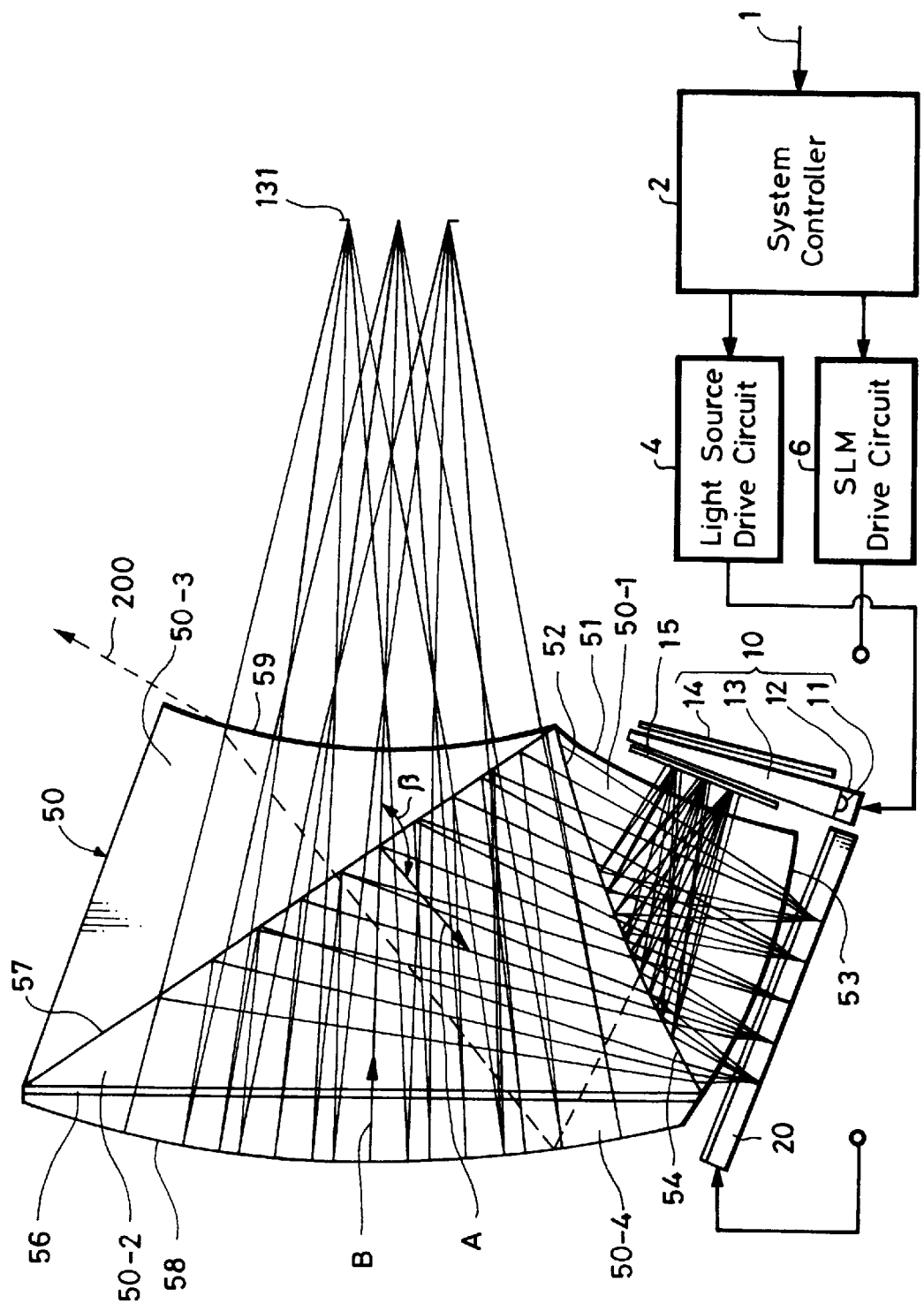
FIG. 15 is a diagram showing a sixth example of a virtual image optical system according to the present invention.

The configuration of the virtual image optical system of the present example is the same as the configuration of the sixth example shown in FIG. 15 except that the quarter-wave plate 56 has been removed in the present example.

As illustrated, the origin is disposed on a point where the exit pupil of the viewing area exists. The z axis is taken along the optical axis, the x axis is taken in the horizontal direction in a plane perpendicular to the optical axis, and the y axis is taken in the vertical direction.

As illustrated, the positive direction of the z axis is taken in such a direction as to leave the virtual image optical system. Specifications of the optical system of the present example are shown below.

Pupil diameter: diameter 12 mm in horizontal direction× diameter 4 mm in vertical direction
(calculation of ray aberration and resolution has been carried out with the pupil diameter of 4 mm)
Eye relief: 20 mm
Horizontal view angle: 32 degrees
Vertical view angle: 24 degrees
Distortion: 5% or less As described above, light fed from the illuminating light source device 10 actually arrives at the exit pupil in the viewing area via the light source optical system, the spatial light modulator, and the eyepiece optics. Here, however, the optical path is traced reversely.

As illustrated, therefore, light proceeding from an exit pupil (STO) of the viewing area to a virtual image (OBJ) is supposed.

This light arrives at the illuminating light source device via the eyepiece optics, the spatial light modulator, and the light source optical system.

Each of the surfaces of the optical system existing on the route of the optical path is given a number in order.

For example, the refractive surface 59 of the glass refractive optical element 50 is given a numeral 3. The forward path and the backward path of the polarization beam splitter 57 are given numerals 4 and 6, respectively. The reflective surface 58 is given a numeral 5.

The pixel display surface of the spatial light modulator 20 is given a numeral 10. The forward path and the backward path of respective sides of the polarizer of the spatial light modulator 20 are given 8 and 9, and 11 and 12.

Each optical surface is represented by the following equations representing an aspheric surface.

In the right side of a first equation, RDY is the radius of curvature, and K, a, b, c and d are constants.

$$Z = RDY \cdot h^2[1+(1-(1+K)RDY^2h^2)^{1/2}]^{-1} + ah^4 + bh^6 + ch^8 + dh^{10}$$

$$H^2 = x^2 + y^2 \quad (6)$$

FIG. 20 shows data of the optical system of the virtual image optical system of the present example. FIG. 21 shows lens data of respective optical surfaces.

The data of the optical system shown in FIG. 20 will now be described briefly.

The surface number is a number given to the surface of each element of the optical system shown in FIG. 19.

OBJ represents the virtual image position, STO represents a pupil, and IMG represents an illuminating light source device.

Surface numbers 8 to 12 represent configuration surfaces of the spatial light modulator.

ASP represents an aspheric surface.

REFL represents a reflective surface, and absence of REFL represents a refractive surface.

The lens data shown in FIG. 21 will now be described briefly.

The lens data will now be describe briefly.

A, B, C, D and K are coefficients of the equation (6). XDE, YDE and ZDE are eccentricities in the X, Y and Z direction, respectively. ADE, BDE and CDE are tilts around the X, Y and Z axes, respectively.

In the table, GLBG1 denotes the pupil coordinate reference. IC:Y means that a first surface is treated as a subject in the case where there are a plurality of aspheric curved surfaces.

FIGS. 22 to 26 show curves representing ray aberration of respective surfaces of the virtual image optical system of the present example.

As illustrated on the right side of each of FIGS. 22 to 26, the ray aberration has been derived for three wavelengths λ.

The ordinate indicates the distance between the position of the chief ray on the field and the position of another ray on the field, represented by taking mm as the unit.

The abscissa represents the ray height at the entrance pupil, and its maximum value is ±2 mm.

In the center of each of FIGS. 22 to 26, X and Y coordinates are put in first parentheses, and the horizontal view angle and the vertical view angle are put in the second parentheses.

Figure 27:
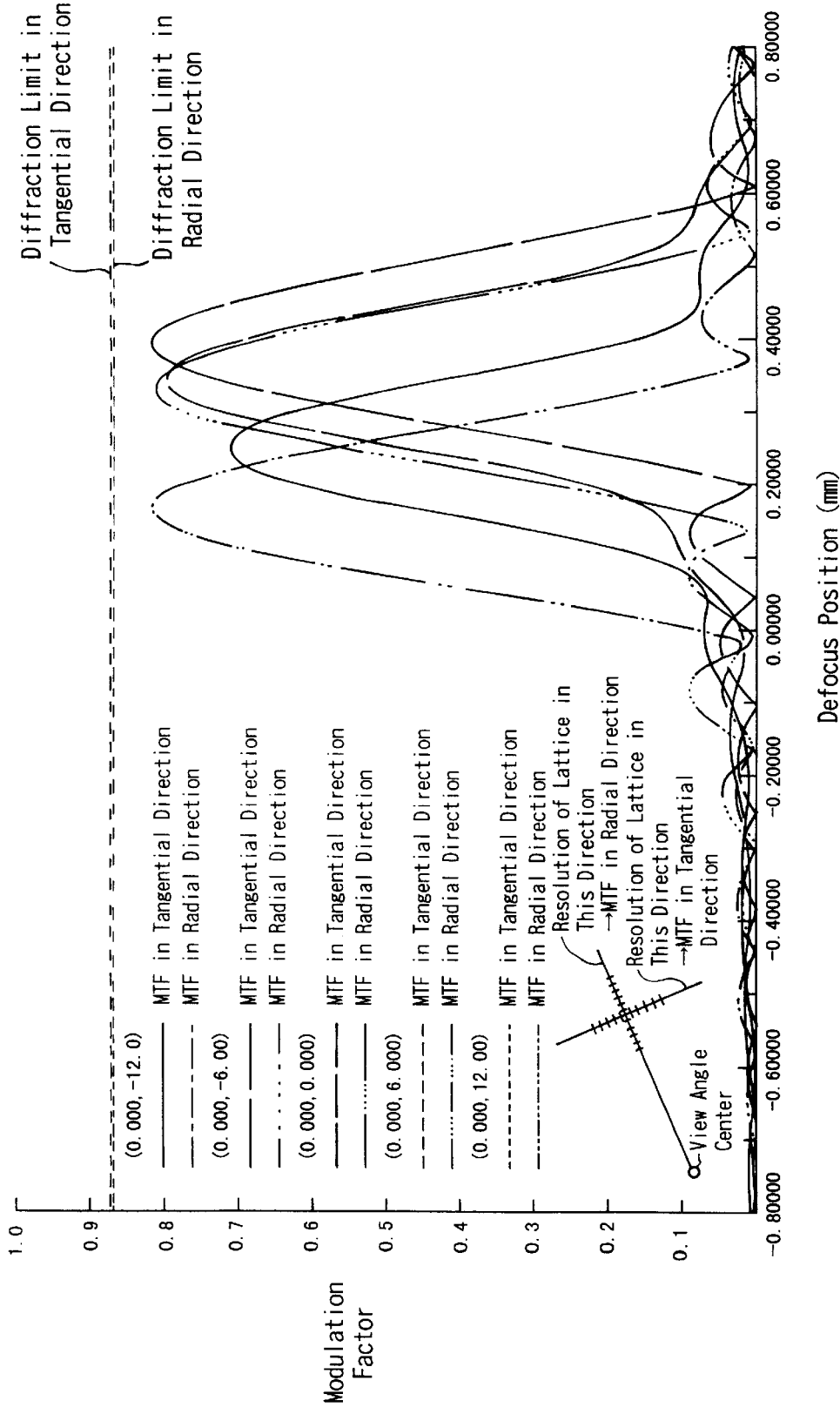
FIG. 27 is a diagram showing MTF of the tenth example of a virtual image optical system according to the present invention.
Figure 28:
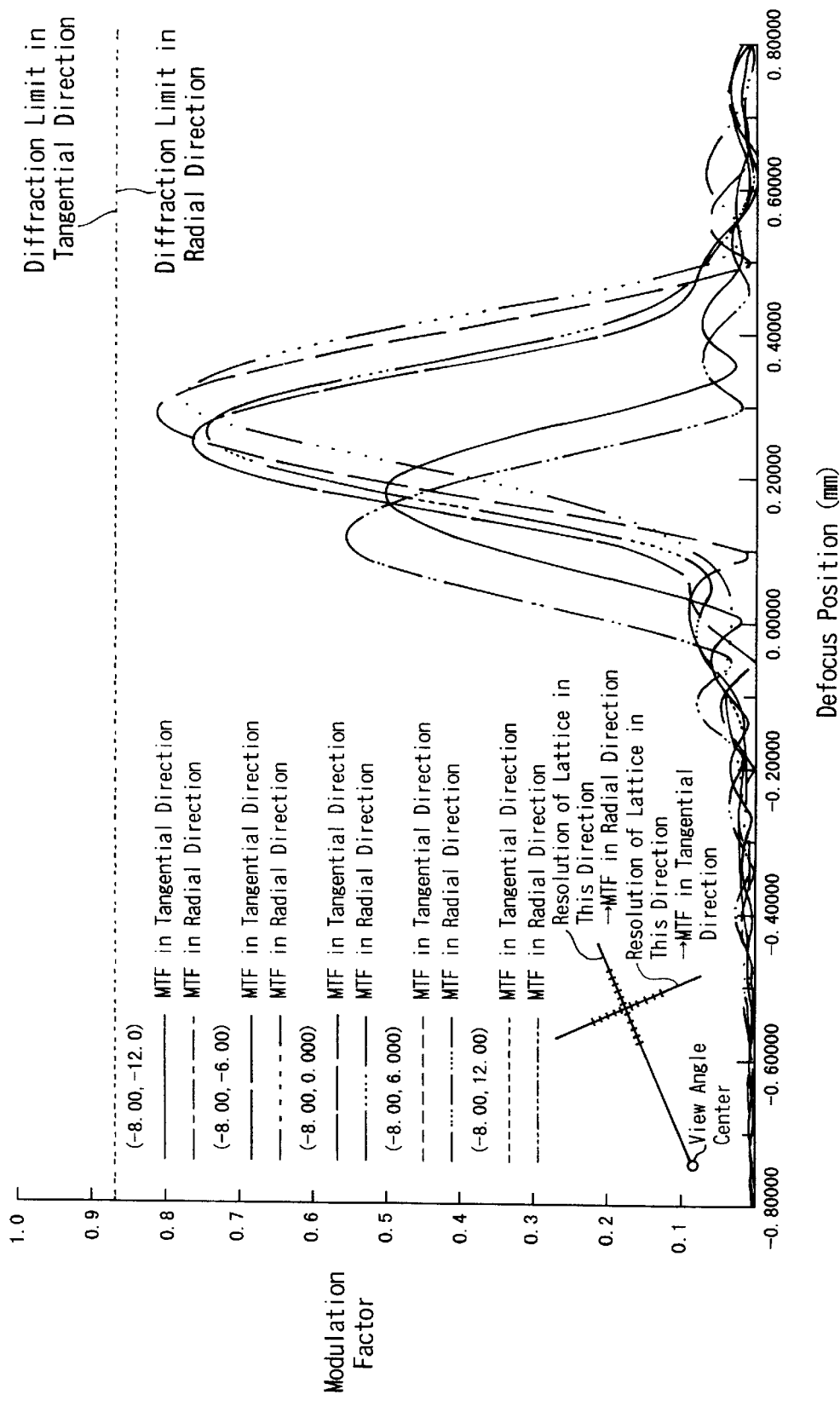
FIG. 28 is a diagram showing MTF of the tenth example of a virtual image optical system according to the present invention.
Figure 29:
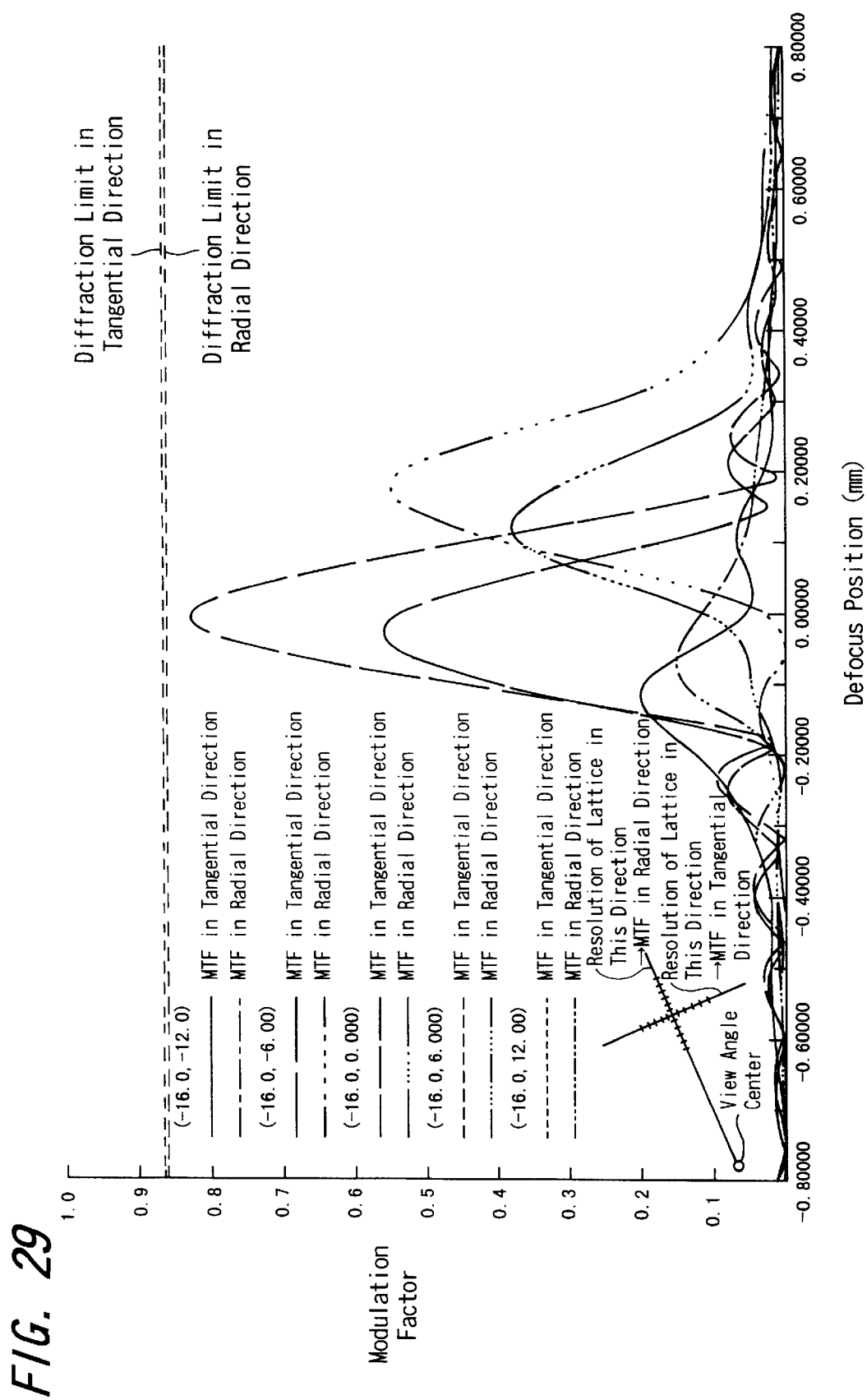
FIG. 29 is a diagram showing MTF of the tenth example of a virtual image optical system according to the present invention.

FIGS. 27 to 29 show MTFs (Modulation Transfer functions).

The ordinate indicates the modulation factor, and the abscissa indicates the defocus position.

Three wavelengths which are the same as those of the case of the ray aberration have been used. A synthetic ray including three wavelengths with a ratio of 1:1:1 has been used.

On the left side of each of FIGS. 27 to 29, the horizontal view angle and vertical view angle are put in parentheses.

Heretofore, an embodiment of the present invention has been described in detail. However, the present invention is not limited to the above-described embodiment. Those skilled in the art should understand easily that other various configurations may be adopted without departing from the gist of the present invention.

In the above-described examples, a liquid crystal spatial light modulator including a liquid crystal device has been used as a reflective spatial light modulator.

In the virtual image optical system of the present invention, however, any type can be used so long as it is a reflective spatial light modulator. For example, other reflective spatial light modulators such as a digital micro mirror device may be used.

Furthermore, in the case where a reflective spatial light modulator other than a liquid crystal spatial light modulator is thus used, optical elements such as a polarizer, an analyzer, a phase difference plate like a quarter-wave plate, a micro lens, a diffuser or the like may be suitably combined and used in the light source optical system and the eyepiece optics, in the same way as the above-described examples.

In the above-described examples, the device including a light source and a light pipe has been used as the illuminating light source device. However, a different illuminating light source device can also be used.

For example, a combination of a diffusion plate or a flyeye lens and a laser light source may also be used.

According to the present invention, an angle β formed by a plane normal vector A formed with respect to the beam splitter of the eyepiece optics and a plane normal vector B formed with respect to the reflector is in the range of 136 degrees to 179 degrees. Therefore, a virtual image optical system in which ghost caused by stray light is reduced can be advantageously provided.

According to the present invention, an angle β formed by a plane normal vector A formed with respect to the beam splitter of the eyepiece optics and a plane normal vector B formed with respect to the reflector is in the range of 136 degrees to 179 degrees. Therefore, a virtual image optical system which is thin in size and light in weight can be advantageously provided.

According to the present invention, an angle β formed by a plane normal vector A formed with respect to the beam splitter of the eyepiece optics and a plane normal vector B formed with respect to the reflector is in the range of 136 degrees to 179 degrees. Therefore, a virtual image optical system which is high in magnification and high in resolution can be advantageously provided.

According to the present invention, degradation of the contrast of the display image can be advantageously minimized by using a refractive optical element having sufficiently small birefringence (typically a refractive optical element is made of glass) as one of the refractive optical elements of the optical system.

Therefore, as compared with the case where a refractive optical element having sufficiently small birefringence (typically a refractive optical element is made of glass) is used as each of all refractive optical elements forming the optical system, the manufacturing cost and the weight of the optical system can be advantageously made small.

According to the present invention, the assembling process can be advantageously simplified by disposing a beam splitter or a reflector of the optical system on one surface of a refractive optical element.

According to the present invention, the field curvature and distortion aberration can be corrected by forming each of surfaces of the refractive optical element as a free curved surface or an aspheric surface.

Therefore, a virtual image optical system having a high resolution can be advantageously provided.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A virtual image optical system comprising:
a reflective spatial light modulator;
an illuminating light source device for providing said reflective spatial light modulator with an illuminating ray;
a light source optical system for leading an illuminating ray fed from said illuminating light source device to said reflective spatial light modulator, said light source optical system including a beam splitter; and
eyepiece optics for leading an image ray fed from said reflective spatial light modulator to a viewing area, said eyepiece optics including a beam splitter and a reflector,
wherein an angle formed by a plane normal vector at a point where a chief ray passing through a center of said reflective spatial light modulator intersects the beam splitter of said eyepiece optics and a plane normal vector at a point where the chief ray intersects said reflector is in the range of 136 degrees to 179 degrees, when a side of ray reflection on each surface of the beam splitter and the reflector of said eyepiece optics is taken as a positive direction of a vector.

2. The virtual image optical system according to claim 1, wherein a polarizer is disposed between said illuminating light source device and the beam splitter of said light source optical system.

3. The virtual image optical system according to claim 1, wherein an analyzer is disposed between the beam splitter of said light source optical system and a viewing area.

4. The virtual image optical system according to claim 1, wherein the beam splitter of said light source optical system is a polarization beam splitter.

5. The virtual image optical system according to claim 1, wherein the beam splitter of said light source optical system is a non-polarization beam splitter.

6. The virtual image optical system according to claim 1, wherein the beam splitter of said light source optical system is a reflective holographic beam splitter.

7. The virtual image optical system according to claim 1, wherein the beam splitter of said light source optical system is a polarization beam splitter.

8. The virtual image optical system according to claim 1, wherein the beam splitter of said eyepiece optics is a non-polarization beam splitter.

9. The virtual image optical system according to claim 1, wherein the beam splitter of said eyepiece optics is a reflective holographic beam splitter.

10. The virtual image optical system according to claim 1, wherein a quarter-wave plate is disposed between the beam splitter of said eyepiece optics and said reflector.

11. The virtual image optical system according to claim 1, wherein the reflector of said eyepiece optics is a reflective holographic optical element.

12. The virtual image optical system according to claim 1, wherein the reflector of said eyepiece optics is a rotationally asymmetric or free surface reflector.

13. The virtual image optical system according to claim 1, wherein said illuminating light source device comprises a light source and a light pipe.

14. The virtual image optical system according to claim 1, wherein said reflective spatial light modulator is a ferroelectric liquid crystal spatial light modulator.

15. A virtual image optical system comprising:
a reflective spatial light modulator;
an illuminating light source device for providing said reflective spatial light modulator with an illuminating ray;
a light source optical system for leading an illuminating ray fed from said illuminating light source device to said reflective spatial light modulator; and
eyepiece optics for leading an image ray fed from said reflective spatial light modulator to a viewing area,
wherein said light source optical system comprises a beam splitter for deflecting the illuminating ray fed from said illuminating light source device and leading the illuminating ray to said reflective spatial light modulator,
said eyepiece optics comprise a refractive optical element filled therein with a medium having a refractive index larger than unity, and
said refractive optical element of said eyepiece optics comprises a refractive surface for accepting the image ray fed from said reflective spatial light modulator, a beam splitter surface for deflecting said image ray, and a reflective surface for reflecting light deflected by said beam splitter surface and leading the light to said viewing area.

16. The virtual image optical system according to claim 15, wherein an angle formed by a plane normal vector at a point where a chief ray passing through a center of said reflective spatial light modulator intersects the beam splitter surface of the refractive optical element of said eyepiece optics and a plane normal vector at a point where the chief ray intersects the reflective surface of the refractive optical element of said eyepiece optics is in the range of 136 degrees to 179 degrees, when a side of ray reflection on each of said beam splitter surface and said reflective surface is taken as a positive direction of a vector.

17. The virtual image optical system according to claim 15, wherein a polarizer is disposed between said illuminating light source device and the beam splitter of said light source optical system.

18. The virtual image optical system according to claim 15, wherein an analyzer is disposed between the beam splitter of said light source optical system and a viewing area.

19. The virtual image optical system according to claim 15, wherein the beam splitter of said light source optical system is a polarization beam splitter.

20. The virtual image optical system according to claim 15, wherein the beam splitter of said light source optical system is a non-polarization beam splitter.

21. The virtual image optical system according to claim 15, wherein the beam splitter of said light source optical system is a reflective holographic beam splitter.

22. The virtual image optical system according to claim 15, wherein a quarter-wave plate is disposed between the beam splitter surface and the reflective surface of the refractive optical element of said eyepiece optics.

23. The virtual image optical system according to claim 15, wherein the beam splitter surface of the refractive optical element of said eyepiece optics is a polarization beam splitter surface.

24. The virtual image optical system according to claim 15, wherein the beam splitter surface of the refractive optical element of said eyepiece optics is a non-polarization beam splitter surface.

25. The virtual image optical system according to claim 15, wherein the beam splitter surface of the refractive optical element of said eyepiece optics is a reflective holographic beam splitter surface.

26. The virtual image optical system according to claim 15, wherein the refractive optical element of said eyepiece optics is formed as an eccentric optical system so that the the beam splitter surface of the refractive optical element of said eyepiece optics will become an internal reflective surface or a refractive surface according to a number of times of incidence of a beam.

27. The virtual image optical system according to claim 15, wherein the beam splitter surface of the refractive optical element of said eyepiece optics satisfies a total reflection condition with respect to an image ray fed from said reflective spatial light modulator.

28. The virtual image optical system according to claim 15, wherein the reflective surface of the refractive optical element of said eyepiece optics is a reflective holographic optical surface.

29. The virtual image optical system according to claim 15, wherein at least one of the beam splitter surface, the reflective surface, and the refractive surface of the refractive optical element of said eyepiece optics is a rotationally asymmetric or free surface.

30. The virtual image optical system according to claim 15, wherein said illuminating light source device comprises a light source and a light pipe.

31. The virtual image optical system according to claim 15, wherein said reflective spatial light modulator is a ferroelectric liquid crystal spatial light modulator.

32. The virtual image optical system according to claim 15, wherein said eyepiece optics comprise a refractive optical element disposed so as to be adjacent to the refractive optical element of said eyepiece optics, and light reflected by the reflective surface of the refractive optical element of said eyepiece optics is led to said viewing area via a refractive surface of said refractive optical element.

33. A virtual image optical system comprising:
a reflective spatial light modulator;
an illuminating light source device for providing said reflective spatial light modulator with an illuminating ray;
a light source optical system for leading an illuminating ray fed from said illuminating light source device to said reflective spatial light modulator; and
eyepiece optics for leading an image ray fed from said reflective spatial light modulator to a viewing area,
wherein each of said light source optical system and said eyepiece optics comprises a refractive optical element filled therein with a medium having a refractive index larger than unity,
the refractive optical element of said light source optical system comprises a first refractive surface for accepting an illuminating ray fed from said illuminating light source device, a second refractive surface for accepting an image ray fed from said reflective spatial light modulator, and a beam splitter surface for deflecting an illuminating ray fed from said illuminating light source device and leading the illuminating ray to said reflective spatial light modulator, and
the refractive optical element of said eyepiece optics comprises a refractive surface for accepting said image ray, a beam splitter surface for deflecting said image ray, and a reflective surface for reflecting light deflected by said beam splitter surface and leading the light to said viewing area.

34. The virtual image optical system according to claim 33, wherein an angle formed by a plane normal vector at a point where a chief ray passing through a center of said reflective spatial light modulator intersects the beam splitter surface of the refractive optical element of said eyepiece optics and a plane normal vector at a point where the chief ray intersects the reflective surface of the refractive optical element of said eyepiece optics is in the range of 136 degrees to 179 degrees, when a side of ray reflection on each of the beam splitter surface and the reflective surface of the refractive optical element of said eyepiece optics is taken as a positive direction of a vector.

35. The virtual image optical system according to claim 33, wherein the refractive optical element of said light source optical system and the refractive optical element of said eyepiece optics are optically closely glued via the beam splitter surface of the refractive optical element of said light source optical system and the refractive surface of the refractive optical element of said eyepiece optics.

36. The virtual image optical system according to claim 33, wherein a polarizer is disposed between said illuminating light source device and the beam splitter surface of the refractive optical element of said light source optical system.

37. The virtual image optical system according to claim 33, wherein an analyzer is disposed between the beam splitter surface of the refractive optical element of said light source optical system and a viewing area.

38. The virtual image optical system according to claim 33, wherein the beam splitter surface of the refractive optical element of said light source optical system is a polarization beam splitter surface.

39. The virtual image optical system according to claim 33, wherein the beam splitter surface of the refractive optical element of said light source optical system is a non-polarization beam splitter surface.

40. The virtual image optical system according to claim 33, wherein the beam splitter surface of the refractive optical element of said light source optical system is a reflective holographic beam splitter surface.

41. The virtual image optical system according to claim 33, wherein at least one of the second refractive surface and the beam splitter surface of the refractive optical element of said light source optical system is a rotationally asymmetric or free surface.

42. The virtual image optical system according to claim 33, wherein a quarter-wave plate is disposed between the beam splitter surface and the reflective surface of the refractive optical element of said eyepiece optics.

43. The virtual image optical system according to claim 33, wherein the beam splitter surface of the refractive optical element of said eyepiece optics is a polarization beam splitter surface.

44. The virtual image optical system according to claim 33, wherein the beam splitter surface of the refractive optical element of said eyepiece optics is a non-polarization beam splitter surface.

45. The virtual image optical system according to claim 33, wherein the beam splitter surface of the refractive optical element of said eyepiece optics is a reflective holographic beam splitter surface.

46. The virtual image optical system according to claim 33, wherein the refractive optical element of said eyepiece optics is formed as an eccentric optical system so that the the beam splitter surface of the refractive optical element of said eyepiece optics will become an internal reflective surface or a refractive surface according to a number of times of incidence of a beam.

47. The virtual image optical system according to claim 33, wherein the beam splitter surface of the refractive optical element of said eyepiece optics satisfies a total reflection condition with respect to an image ray fed from said reflective spatial light modulator.

48. The virtual image optical system according to claim 33, wherein at least one of the beam splitter surface, the reflective surface, and the refractive surface of the refractive optical element of said eyepiece optics is a rotationally asymmetric or free surface.

49. The virtual image optical system according to claim 33, wherein the reflective surface of the refractive optical element of said eyepiece optics is a reflective holographic optical surface.

50. The virtual image optical system according to claim 33, wherein the refractive optical element of said light source optical system is a refractive optical element made of glass, and the refractive optical element of said eyepiece optics is a refractive optical element made of plastic.

51. The virtual image optical system according to claim 33, wherein said illuminating light source device comprises a light source and a light pipe.

52. The virtual image optical system according to claim 33, wherein said reflective spatial light modulator is a ferroelectric liquid crystal spatial light modulator.

53. The virtual image optical system according to claim 33, wherein said eyepiece optics comprise a refractive optical element disposed so as to be adjacent to the refractive optical element of said eyepiece optics, and light reflected by the reflective surface of the refractive optical element of said eyepiece optics is led to said viewing area via a refractive surface of said refractive optical element.

54. A virtual image optical system comprising:
 a reflective spatial light modulator;
 an illuminating light source device for providing said reflective spatial light modulator with an illuminating ray;
 a light source optical system for leading an illuminating ray fed from said illuminating light source device to said reflective spatial light modulator; and
 eyepiece optics for leading an image ray fed from said reflective spatial light modulator to a viewing area,
 wherein said light source optical system comprises a refractive optical element filled therein with a medium having a refractive index larger than unity,
 said eyepiece optics comprise a first and second refractive optical elements each filled therein with a medium having a refractive index larger than unity,
 the refractive optical element of said light source optical system comprises a first refractive surface for accepting an illuminating ray fed from said illuminating light source device, a second refractive surface for accepting an image ray fed from said reflective spatial light modulator, and a beam splitter surface for deflecting an illuminating ray fed from said illuminating light source device and leading the illuminating ray to said reflective spatial light modulator, and
 the first refractive optical element of said eyepiece optics comprises a refractive surface for accepting an image ray fed from the refractive optical element of said light source optical system, a beam splitter surface for deflecting said image ray, and a reflective surface for reflecting light deflected by said beam splitter surface and leading the light to said beam splitter surface again,
 the second refractive optical element of said eyepiece optics comprises a first refractive surface for accepting light fed from the beam splitter surface of the first refractive optical element of said eyepiece optics and a second refractive surface for leading light fed from said first refractive surface to said viewing area, and the refractive optical element of said light source optical system and the first refractive optical element of said eyepiece optics are optically closely glued via the beam splitter surface of the refractive optical element of said light source optical system and the refractive surface of the first refractive optical element of said eyepiece optics, and
 the first refractive optical element and the second refractive optical element of said eyepiece optics are optically closely glued via the beam splitter surface of the first refractive optical element of said eyepiece optics and the first refractive surface of the second refractive optical element of said eyepiece optics.

55. The virtual image optical system according to claim 54, wherein an angle formed by a plane normal vector at a point where a chief ray passing through a center of said reflective spatial light modulator intersects the beam splitter surface of the first refractive optical element of said eyepiece optics and a plane normal vector at a point where the chief ray intersects the reflective surface of the first refractive optical element of said eyepiece optics is in the range of 136 degrees to 179 degrees, when a side of ray reflection on each of the beam splitter surface and the reflective surface of the first refractive optical element of said eyepiece optics is taken as a positive direction of a vector.

56. The virtual image optical system according to claim 54, wherein a polarizer is disposed between said illuminating light source device and the beam splitter surface of the refractive optical element of said light source optical system.

57. The virtual image optical system according to claim 54, wherein an analyzer is disposed between the beam splitter surface of the refractive optical element of said light source optical system and a viewing area.

58. The virtual image optical system according to claim 54, wherein the beam splitter surface of the refractive optical element of said light source optical system is a polarization beam splitter surface.

59. The virtual image optical system according to claim 54, wherein the beam splitter surface of the refractive optical element of said light source optical system is a non-polarization beam splitter surface.

60. The virtual image optical system according to claim 54, wherein the beam splitter surface of the refractive optical element of said light source optical system is a reflective holographic beam splitter surface.

61. The virtual image optical system according to claim 54, wherein the second refractive surface of the refractive optical element of said light source optical system is an axial symmetric aspheric surface.

62. The virtual image optical system according to claim 54, wherein the second refractive surface of the refractive optical element of said light source optical system is a rotationally asymmetric or free surface.

63. The virtual image optical system according to claim 54, wherein a quarter-wave plate is disposed between the beam splitter surface and the reflective surface of the first refractive optical element of said eyepiece optics.

64. The virtual image optical system according to claim 54, wherein the beam splitter surface of the first refractive optical element of said eyepiece optics is a polarization beam splitter surface.

65. The virtual image optical system according to claim 54, wherein the beam splitter surface of the first refractive optical element of said eyepiece optics is a non-polarization beam splitter surface.

66. The virtual image optical system according to claim 54, wherein the beam splitter surface of the first refractive optical element of said eyepiece optics is a reflective holographic beam splitter surface.

67. The virtual image optical system according to claim 54, wherein the reflective surface of the first refractive optical element of said eyepiece optics is a reflective holographic optical surface.

68. The virtual image optical system according to claim 54, wherein the reflective surface of the first refractive optical element of said eyepiece optics is an axial symmetric aspheric surface.

69. The virtual image optical system according to claim 54, wherein the reflective surface of the first refractive optical element of said eyepiece optics is a rotationally asymmetric or free surface.

70. The virtual image optical system according to claim 54, wherein the second refractive surface of the second refractive optical element of said eyepiece optics is an axial symmetric aspheric surface.

71. The virtual image optical system according to claim 54, wherein the second refractive surface of the second refractive optical element of said eyepiece optics is a rotationally asymmetric or free surface.

72. The virtual image optical system according to claim 54, wherein the refractive optical element of said light source optical system is a refractive optical element made of glass, and each of the first and second refractive optical elements of said eyepiece optics is a refractive optical element made of plastic.

73. The virtual image optical system according to claim 54, wherein said illuminating light source device comprises a light source and a light pipe.

74. The virtual image optical system according to claim 54, wherein said reflective spatial light modulator is a ferroelectric liquid crystal spatial light modulator.

75. A virtual image optical system comprising:
   a reflective spatial light modulator;
   an illuminating light source device for providing said reflective spatial light modulator with an illuminating ray;
   a light source optical system for leading an illuminating ray fed from said illuminating light source device to said reflective spatial light modulator; and
   eyepiece optics for leading an image ray fed from said reflective spatial light modulator to a viewing area,
   wherein said light source optical system comprises a refractive optical element filled therein with a medium having a refractive index larger than unity,
   said eyepiece optics comprise a first and second refractive optical elements each filled therein with a medium having a refractive index larger than unity,
   the refractive optical element of said light source optical system comprises a first refractive surface for accepting an illuminating ray fed from said illuminating light source device, a second refractive surface for accepting an image ray fed from said reflective spatial light modulator, and a beam splitter surface for deflecting an illuminating ray fed from said illuminating light source device and leading the illuminating ray to said reflective spatial light modulator, and
   the first refractive optical element of said eyepiece optics comprises a refractive surface for accepting an image ray fed from the refractive optical element of said light source optical system, a beam splitter surface for deflecting said image ray, and a reflective surface for reflecting light deflected by said beam splitter surface and leading the light to said beam splitter surface again,
   the second refractive optical element of said eyepiece optics comprises a first refractive surface for accepting light fed from the beam splitter surface of the first refractive optical element of said eyepiece optics and a second refractive surface for leading light fed from said first refractive surface to said viewing area, and
   the refractive optical element of said light source optical system and the first refractive optical element of said eyepiece optics are optically closely glued via the beam splitter surface of the refractive optical element of said light source optical system and the refractive surface of the first refractive optical element of said eyepiece optics.

76. The virtual image optical system according to claim 75, wherein an angle formed by a plane normal vector at a point where a chief ray passing through a center of said reflective spatial light modulator intersects the beam splitter surface of the first refractive optical element of said eyepiece optics and a plane normal vector at a point where the chief ray intersects the reflective surface of the first refractive optical element of said eyepiece optics is in the range of 136 degrees to 179 degrees, when a side of ray reflection on each of the beam splitter surface and the reflective surface of the first refractive optical element of said eyepiece optics is taken as a positive direction of a vector.

77. The virtual image optical system according to claim 75, wherein a polarizer is disposed between said illuminating light source device and the beam splitter surface of the refractive optical element of said light source optical system.

78. The virtual image optical system according to claim 75, wherein an analyzer is disposed between the beam splitter surface of the refractive optical element of said light source optical system and a viewing area.

79. The virtual image optical system according to claim 75, wherein the beam splitter surface of the refractive optical element of said light source optical system is a polarization beam splitter surface.

80. The virtual image optical system according to claim 75, wherein the beam splitter surface of the refractive optical element of said light source optical system is a non-polarization beam splitter surface.

81. The virtual image optical system according to claim 75, wherein the beam splitter surface of the refractive optical element of said light source optical system is a reflective holographic beam splitter surface.

82. The virtual image optical system according to claim 75, wherein the second refractive surface of the refractive optical element of said light source optical system is an axial symmetric aspheric surface.

83. The virtual image optical system according to claim 75, wherein the second refractive surface of the refractive optical element of said light source optical system is a rotationally asymmetric or free surface.

84. The virtual image optical system according to claim 75, wherein a quarter-wave plate is disposed between the beam splitter surface and the reflective surface of the first refractive optical element of said eyepiece optics.

85. The virtual image optical system according to claim 75, wherein the beam splitter surface of the first refractive optical element of said eyepiece optics is a polarization beam splitter surface.

86. The virtual image optical system according to claim 75, wherein the beam splitter surface of the first refractive optical element of said eyepiece optics is a non-polarization beam splitter surface.

87. The virtual image optical system according to claim 75, wherein the beam splitter surface of the first refractive optical element of said eyepiece optics is a reflective holographic beam splitter surface.

88. The virtual image optical system according to claim 75, wherein the beam splitter surface of the first refractive optical element of said eyepiece optics satisfies a total reflection condition with respect to an image ray fed from said reflective spatial light modulator.

89. The virtual image optical system according to claim 75, wherein the first refractive optical element of said eyepiece optics is formed as an eccentric optical system so that the the beam splitter surface of the first refractive optical element of said eyepiece optics will become an internal reflective surface or a refractive surface according to a number of times of incidence of a beam.

90. The virtual image optical system according to claim 75, wherein at least one of the beam splitter surface and the reflective surface of the first refractive optical element of said eyepiece optics is an axial symmetric aspheric surface.

91. The virtual image optical system according to claim 75, wherein at least one of the beam splitter surface and the reflective surface of the first refractive optical element of said eyepiece optics is a rotationally asymmetric or free surface.

92. The virtual image optical system according to claim 75, wherein the reflective surface of the first refractive optical element of said eyepiece optics is a reflective holographic optical surface.

93. The virtual image optical system according to claim 75, wherein at least one of the two refractive surfaces of the second refractive optical element of said eyepiece optics is an axial symmetric aspheric surface.

94. The virtual image optical system according to claim 75, wherein at least one of the two refractive surfaces of the second refractive optical element of said eyepiece optics is a rotationally asymmetric or free surface.

95. The virtual image optical system according to claim 75, wherein the refractive optical element of said light source optical system is a refractive optical element made of glass, and each of the first and second refractive optical elements of said eyepiece optics is a refractive optical element made of plastic.

96. The virtual image optical system according to claim 75, wherein the refractive optical element of said light source optical system and the first refractive optical element of said eyepiece optics are optically closely glued via an analyzer interposed between the beam splitter surface of the refractive optical element of said light source optical system and the refractive surface of the first refractive optical element of said eyepiece optics.

97. The virtual image optical system according to claim 75, wherein said illuminating light source device comprises a light source and a light pipe.

98. The virtual image optical system according to claim 75, wherein said reflective spatial light modulator is a ferroelectric liquid crystal spatial light modulator.

99. A virtual image optical system comprising:
a reflective spatial light modulator;
an illuminating light source device for providing said reflective spatial light modulator with an illuminating ray;
a light source optical system for leading an illuminating ray fed from said illuminating light source device to said reflective spatial light modulator; and
eyepiece optics for leading an image ray fed from said reflective spatial light modulator to a viewing area,
wherein said light source optical system comprises a refractive optical element filled therein with a medium having a refractive index larger than unity,
said eyepiece optics comprise a first and a second refractive optical elements each filled therein with a medium having a refractive index larger than unity,
the refractive optical element of said light source optical system comprises a first refractive surface for accepting an illuminating ray fed from said illuminating light source device, a second refractive surface for accepting an image ray fed from said reflective spatial light modulator, and a beam splitter surface for deflecting an illuminating ray fed from said illuminating light source device and leading the illuminating ray to said reflective spatial light modulator,
the first refractive optical element of said eyepiece optics comprises a refractive surface for accepting an image ray fed from the refractive optical element of said light source optical system, a beam splitter surface for deflecting said image ray, and a reflective surface for reflecting light deflected by said beam splitter surface and leading the light to said beam splitter surface again,
the second refractive optical element of said eyepiece optics comprises a first refractive surface for accepting light fed from the beam splitter surface of the first refractive optical element of said eyepiece optics and a second refractive surface for leading light fed from said first refractive surface to said viewing area, and
the first refractive optical element and the second refractive optical element of said eyepiece optics are optically closely glued via the beam splitter surface of the first refractive optical element of said eyepiece optics and the first refractive surface of the second refractive optical element of said eyepiece optics.

100. The virtual image optical system according to claim 99, wherein an angle formed by a plane normal vector at a point where a chief ray passing through a center of said reflective spatial light modulator intersects the beam splitter surface of the first refractive optical element of said eyepiece optics and a plane normal vector at a point where the chief ray intersects the reflective surface of the first refractive optical element of said eyepiece optics is in the range of 136 degrees to 179 degrees, when a side of ray reflection on each of the beam splitter surface and the reflective surface of the first refractive optical element of said eyepiece optics is taken as a positive direction of a vector.

101. The virtual image optical system according to claim 99, wherein a polarizer is disposed between said illuminating light source device and the beam splitter surface of the refractive optical element of said light source optical system.

102. The virtual image optical system according to claim 99, wherein an analyzer is disposed between the beam splitter surface of the refractive optical element of said light source optical system and a viewing area.

103. The virtual image optical system according to claim 99, wherein the beam splitter surface of the refractive optical element of said light source optical system is a polarization beam splitter surface.

104. The virtual image optical system according to claim 99, wherein the beam splitter surface of the refractive optical element of said light source optical system is a non-polarization beam splitter surface.

105. The virtual image optical system according to claim 99, wherein the beam splitter surface of the refractive optical element of said light source optical system is a reflective holographic beam splitter surface.

106. The virtual image optical system according to claim 99, wherein at least one of the second refractive surface and the beam splitter surface of the refractive optical element of said light source optical system is an axial symmetric aspheric surface.

107. The virtual image optical system according to claim 99, wherein at least one of the second refractive surface and the beam splitter surface of the refractive optical element of said light source optical system is a rotationally asymmetric or free surface.

108. The virtual image optical system according to claim 99, wherein a quarter-wave plate is disposed between the beam splitter surface and the reflective surface of the first refractive optical element of said eyepiece optics.

109. The virtual image optical system according to claim 99, wherein the beam splitter surface of the first refractive optical element of said eyepiece optics is a polarization beam splitter surface.

110. The virtual image optical system according to claim 99, wherein the beam splitter surface of the first refractive optical element of said eyepiece optics is a non-polarization beam splitter surface.

111. The virtual image optical system according to claim 99, wherein the beam splitter surface of the first refractive optical element of said eyepiece optics is a reflective holographic beam splitter surface.

112. The virtual image optical system according to claim 99, wherein at least one of the reflective surface and the refractive surface of the first refractive optical element of said eyepiece optics is an axial symmetric aspheric surface.

113. The virtual image optical system according to claim 99, wherein at least one of the reflective surface and the refractive surface of the first refractive optical element of said eyepiece optics is a rotationally asymmetric or free surface.

114. The virtual image optical system according to claim 99, wherein the reflective surface of the first refractive optical element of said eyepiece optics is a reflective holographic optical surface.

115. The virtual image optical system according to claim 99, wherein the second refractive surface of the second refractive optical element of said eyepiece optics is an axial symmetric aspheric surface.

116. The virtual image optical system according to claim 99, wherein the second refractive surface of the second refractive optical element of said eyepiece optics is a rotationally asymmetric or free surface.

117. The virtual image optical system according to claim 99, wherein the refractive optical element of said light source optical system is a refractive optical element made of glass, and each of the first and second refractive optical elements of said eyepiece optics is a refractive optical element made of plastic.

118. The virtual image optical system according to claim 99, wherein said illuminating light source device comprises a light source and a light pipe.

119. The virtual image optical system according to claim 99, wherein said reflective spatial light modulator is a ferroelectric liquid crystal spatial light modulator.

120. A virtual image optical system comprising:
    a reflective spatial light modulator;
    an illuminating light source device for providing said reflective spatial light modulator with an illuminating ray;
    a light source optical system for leading an illuminating ray fed from said illuminating light source device to said reflective spatial light modulator; and
    eyepiece optics for leading an image ray fed from said reflective spatial light modulator to a viewing area,
    wherein said light source optical system comprises a refractive optical element filled therein with a medium having a refractive index larger than unity,
    said eyepiece optics comprise a first and a second refractive optical elements each filled therein with a medium having a refractive index larger than unity,
    the refractive optical element of said light source optical system comprises a first refractive surface for accepting an illuminating ray fed from said illuminating light source device, a second refractive surface for accepting an image ray fed from said reflective spatial light modulator, and a beam splitter surface for deflecting an illuminating ray fed from said illuminating light source device and leading the illuminating ray to said reflective spatial light modulator,
    the first refractive optical element of said eyepiece optics comprises a refractive surface for accepting an image ray fed from the refractive optical element of said light source optical system, a beam splitter surface for deflecting said image ray, and a reflective surface for reflecting light deflected by said beam splitter surface and leading the light to said beam splitter surface again, and
    the second refractive optical element of said eyepiece optics comprises a first refractive surface for accepting light fed from the beam splitter surface of the first refractive optical element of said eyepiece optics and a second refractive surface for leading light fed from said first refractive surface to said viewing area.

121. The virtual image optical system according to claim 120, wherein an angle formed by a plane normal vector at a point where a chief ray passing through a center of said reflective spatial light modulator intersects the beam splitter surface of the first refractive optical element of said eyepiece optics and a plane normal vector at a point where the chief ray intersects the reflective surface of the first refractive optical element of said eyepiece optics is in the range of 136 degrees to 179 degrees, when a side of ray reflection on each of the beam splitter surface and the reflective surface of the first refractive optical element of said eyepiece optics is taken as a positive direction of a vector.

122. The virtual image optical system according to claim 120, wherein a polarizer is disposed between said illuminating light source device and the beam splitter surface of the refractive optical element of said light source optical system.

123. The virtual image optical system according to claim 120, wherein an analyzer is disposed between the beam splitter surface of the refractive optical element of said light source optical system and a viewing area.

124. The virtual image optical system according to claim 120, wherein the beam splitter surface of the refractive optical element of said light source optical system is a polarization beam splitter surface.

125. The virtual image optical system according to claim 120, wherein the beam splitter surface of the refractive optical element of said light source optical system is a non-polarization beam splitter surface.

126. The virtual image optical system according to claim 120, wherein the beam splitter surface of the refractive optical element of said light source optical system is a reflective holographic beam splitter surface.

127. The virtual image optical system according to claim 120, wherein at least one of the two refractive surfaces of the refractive optical element of said light source optical system is an axial symmetric aspheric surface.

128. The virtual image optical system according to claim 120, wherein at least one of the second refractive surface and the beam splitter surface of the refractive optical element of said light source optical system is a rotationally asymmetric or free surface.

129. The virtual image optical system according to claim 120, wherein a quarter-wave plate is disposed between the beam splitter surface and the reflective surface of the first refractive optical element of said eyepiece optics.

130. The virtual image optical system according to claim 120, wherein the beam splitter surface of the first refractive optical element of said eyepiece optics is a polarization beam splitter surface.

131. The virtual image optical system according to claim 120, wherein the beam splitter surface of the first refractive optical element of said eyepiece optics is a non-polarization beam splitter surface.

132. The virtual image optical system according to claim 120, wherein the beam splitter surface of the first refractive optical element of said eyepiece optics is a reflective holographic beam splitter surface.

133. The virtual image optical system according to claim 120, wherein the beam splitter surface of the first refractive optical element of said eyepiece optics satisfies a total reflection condition with respect to an image ray fed from said reflective spatial light modulator.

134. The virtual image optical system according to claim 120, wherein the first refractive optical element of said eyepiece optics is formed as an eccentric optical system so that the the beam splitter surface of the first refractive optical element of said eyepiece optics will become an internal reflective surface or a refractive surface according to a number of times of incidence of a beam.

135. The virtual image optical system according to claim 120, wherein at least one of the beam splitter surface, the reflective surface, and the refractive surface of the first refractive optical element of said eyepiece optics is an axial symmetric aspheric surface.

136. The virtual image optical system according to claim 120, wherein at least one of the beam splitter surface, the reflective surface, and the refractive surface of the first refractive optical element of said eyepiece optics is a rotationally asymmetric or free surface.

137. The virtual image optical system according to claim 120, wherein the reflective surface of the first refractive optical element of said eyepiece optics is a reflective holographic optical surface.

138. The virtual image optical system according to claim 120, wherein at least one of the two refractive surfaces of the second refractive optical element of said eyepiece optics is an axial symmetric aspheric surface.

139. The virtual image optical system according to claim 120, wherein at least one of the two refractive surfaces of the second refractive optical element of said eyepiece optics is a rotationally asymmetric or free surface.

140. The virtual image optical system according to claim 120, wherein the refractive optical element of said light source optical system is a refractive optical element made of glass, and each of the first and second refractive optical elements of said eyepiece optics is a refractive optical element made of plastic.

141. The virtual image optical system according to claim 120, wherein said illuminating light source device comprises a light source and a light pipe.

142. The virtual image optical system according to claim 120, wherein said reflective spatial light modulator is a ferroelectric liquid crystal spatial light modulator.

143. A virtual image optical system comprising:
a reflective spatial light modulator;
an illuminating light source device for providing said reflective spatial light modulator with an illuminating ray;
a light source optical system for leading an illuminating ray fed from said illuminating light source device to said reflective spatial light modulator; and
eyepiece optics for leading an image ray fed from said reflective spatial light modulator to a viewing area,
wherein said light source optical system comprises a beam splitter for deflecting the illuminating ray fed from said illuminating light source device and leading the illuminating ray to said reflective spatial light modulator,
said eyepiece optics comprise a refractive optical element filled therein with a medium having a refractive index larger than unity,
the refractive optical element of said eyepiece optics comprises a first refractive surface for accepting an image ray fed from said reflective spatial light modulator, a beam splitter surface for deflecting said image ray, a reflective surface for reflecting the light deflected by said beam splitter surface, and a second refractive surface for leading light fed from said reflective surface to said viewing area, and
each of said first and second refractive surfaces is formed so as to become an rotationally symmetric curved surface having a chief ray passing through a center of said reflective spatial light modulator as a rotation symmetric axis.

144. The virtual image optical system according to claim 143, wherein a polarizer is disposed between said illuminating light source device and the beam splitter of said light source optical system.

145. The virtual image optical system according to claim 143, wherein an analyzer is disposed between the beam splitter of said light source optical system and a viewing area.

146. The virtual image optical system according to claim 143, wherein the beam splitter of said light source optical system is a polarization beam splitter.

147. The virtual image optical system according to claim 143, wherein the beam splitter of said light source optical system is a non-polarization beam splitter.

148. The virtual image optical system according to claim 143, wherein the beam splitter of said light source optical system is a reflective holographic beam splitter.

149. The virtual image optical system according to claim 143, wherein the beam splitter of said eyepiece optics is a polarization beam splitter.

150. The virtual image optical system according to claim 143, wherein the beam splitter of said eyepiece optics is a non-polarization beam splitter.

151. The virtual image optical system according to claim 143, wherein the beam splitter of said eyepiece optics is a reflective holographic beam splitter.

152. The virtual image optical system according to claim 143, wherein a quarter-wave plate is disposed between the beam splitter and said reflector of said eyepiece optics.

153. The virtual image optical system according to claim 143, wherein the reflector of said eyepiece optics is a reflective holographic optical element.

154. The virtual image optical system according to claim 143, wherein said illuminating light source device comprises a light source and a light pipe.

155. The virtual image optical system according to claim 143, wherein said reflective spatial light modulator is a ferroelectric liquid crystal spatial light modulator.

* * * * *